US005646796A

United States Patent [19]
Kimura et al.

[11] Patent Number: 5,646,796
[45] Date of Patent: Jul. 8, 1997

[54] APPARATUS AND METHOD FOR RECORDING AND REPRODUCING TOPIC DATA WITH DIGITAL VIDEO AND AUDIO DATA

[75] Inventors: Masanori Kimura, Aichi; Masaki Oguro, Tokyo, both of Japan

[73] Assignee: Sony Corporation, Tokyo, Japan

[21] Appl. No.: 237,161

[22] Filed: May 3, 1994

[30]   Foreign Application Priority Data

May 10, 1993   [JP]   Japan ................... 5-108564

[51] Int. Cl.$^6$ ............................................. G11B 15/087
[52] U.S. Cl. ..................... 360/72.2; 360/72.1; 360/48; 386/95; 386/96; 386/98
[58] Field of Search .................... 348/468, 482–484; 358/343, 341, 335; 360/14.1, 27, 33.1, 72.2, 19.1, 72.1, 18, 48; 386/52, 96, 95, 46, 98, 39, 40, 99, 102, 104, 105, 106, 124, 126, 125

[56]   References Cited

U.S. PATENT DOCUMENTS

| | | | |
|---|---|---|---|
| 4,723,181 | 2/1988 | Hickok | 360/72.2 |
| 4,870,515 | 9/1989 | Stokes | 360/72.2 |
| 4,908,707 | 3/1990 | Kinghorn | 348/468 X |
| 5,038,231 | 8/1991 | Harigaya et al. | 360/72.2 X |
| 5,065,388 | 11/1991 | Roth et al. | 360/72.2 X |
| 5,121,269 | 6/1992 | Tsuchida et al. | 360/72.2 |
| 5,299,006 | 3/1994 | Kim | 348/571 |
| 5,299,069 | 3/1994 | Kohsaka et al. | 360/72.2 X |
| 5,361,179 | 11/1994 | Suzuki et al. | 360/72.2 |
| 5,373,324 | 12/1994 | Kuroda et al. | 348/468 |
| 5,384,674 | 1/1995 | Nishida et al. | 360/72.2 |
| 5,392,166 | 2/1995 | Furuya et al. | 360/14.1 X |
| 5,396,374 | 3/1995 | Kubota | 360/19.1 X |
| 5,479,268 | 12/1995 | Young et al. | 360/33.1 X |
| 5,488,409 | 1/1996 | Yuen et al. | 360/27 X |

FOREIGN PATENT DOCUMENTS

| | | |
|---|---|---|
| 0325325 | 7/1989 | European Pat. Off. . |
| 0439282 | 7/1991 | European Pat. Off. . |
| 0574889 | 12/1993 | European Pat. Off. . |
| 0595411 | 5/1994 | European Pat. Off. . |
| 0615382 | 9/1994 | European Pat. Off. . |
| 2158831 | 2/1992 | Japan . |
| 3320225 | 6/1993 | Japan . |
| 2155683 | 9/1985 | United Kingdom . |

OTHER PUBLICATIONS

Patent Abstracts of Japan, vol. 15, No. 498 (E–1146), 17 Dec. 1991 & JP–A–03 217179.
Patent Abstracts of Japan, vol. 17, No. 457 (P–1597), 20 Aug. 1993 & JP–A–05 101528, 23 Apr. 1993.
Patent Abstracts of Japan, vol. 17, No. 411 (E–1046), 30 Jul. 1993 & JP–A_05 076047, 26 Mar. 1993.

Primary Examiner—Andrew L. Sniezek
Assistant Examiner—Larry T. Cullen
Attorney, Agent, or Firm—William S. Frommer; Alvin Sinderbrand

[57]   ABSTRACT

Apparatus and method for recording digital video and audio data on a record medium receives digital video and audio data and topic data having identifying topics, and generates menu data in accordance with those identifying topics. The video and audio data, topic data and menu data are recorded on a record medium in the form of a coded signal having the recording format comprised of respective video, audio and subcode areas in which the video data, the audio data and the menu data, respectively, are provided. The video and audio areas have respective auxiliary areas in which the topic data is provided. In addition, auxiliary character data is generated when character information is received by a teletext broadcast system and recorded in the auxiliary areas of the video and audio areas of each track.

39 Claims, 35 Drawing Sheets

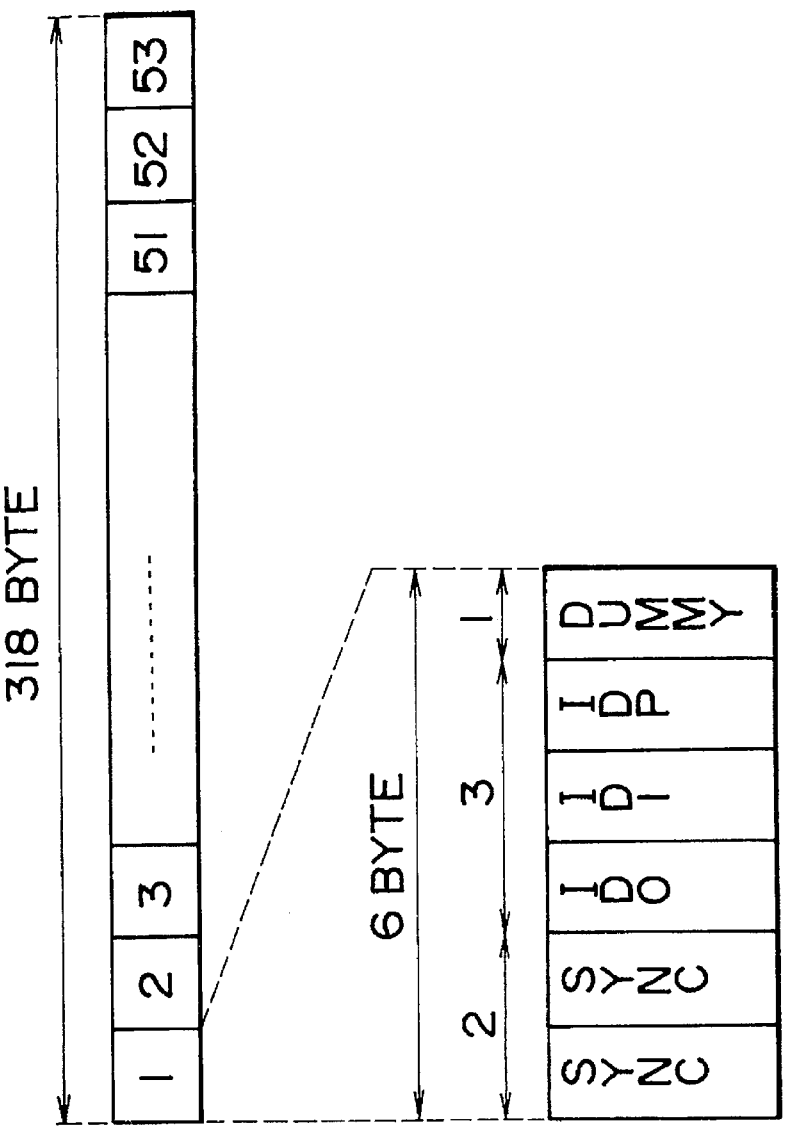

[AUDIO]
F I G. 4A
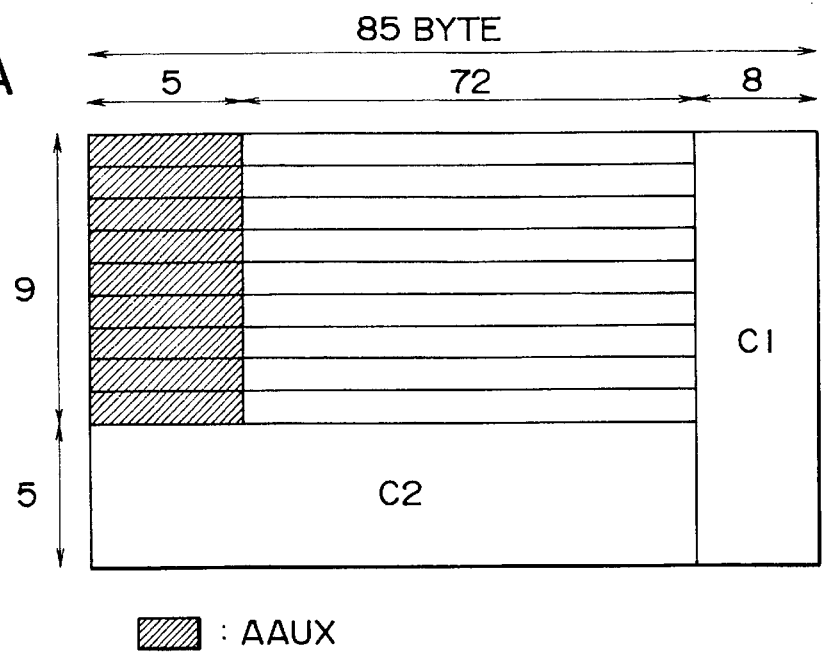
■ : AAUX
F I G. 4B
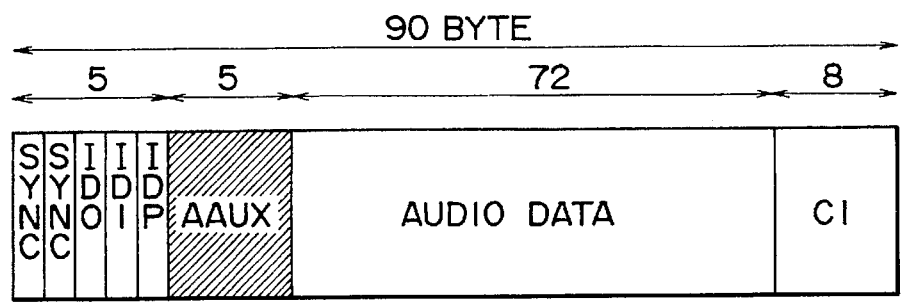

▨ : VAUX

F I G. 6A
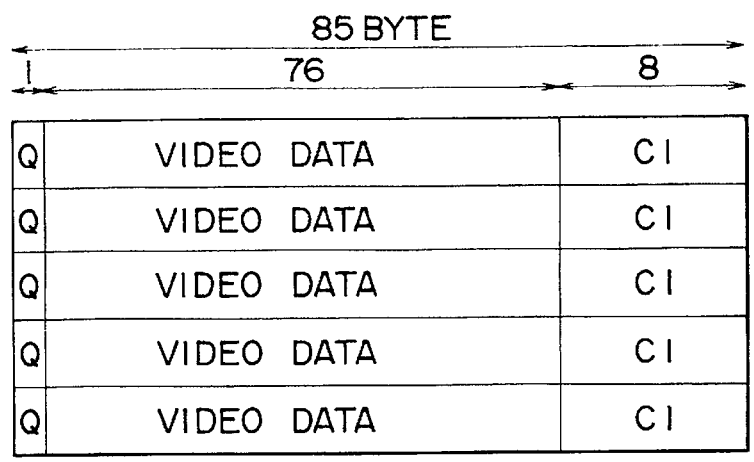
F I G. 6B
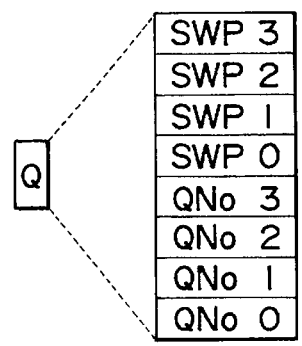
F I G. 6C
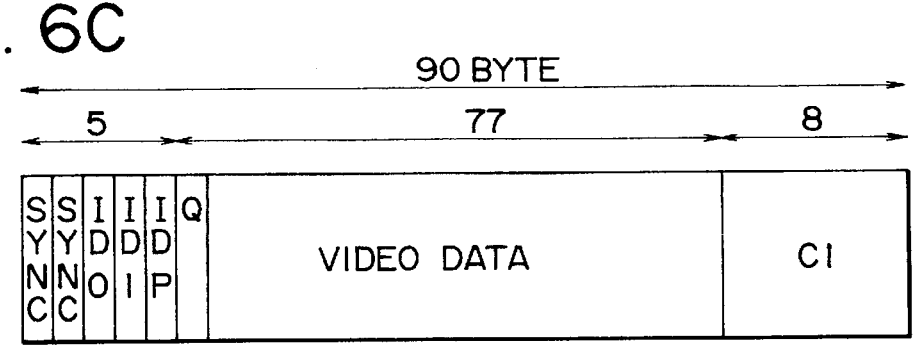
F I G. 6D
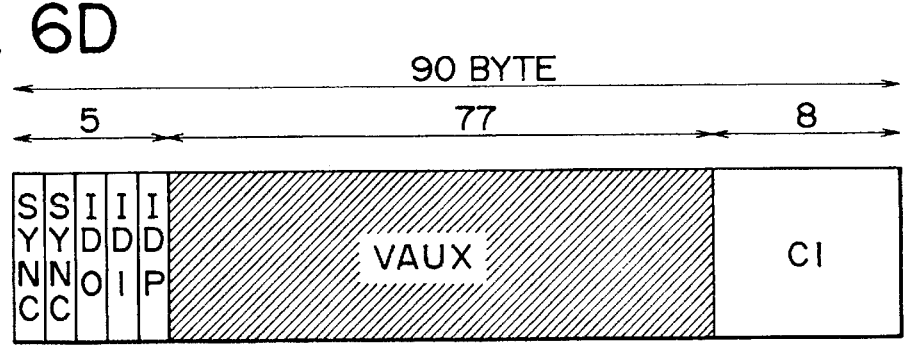

[SUBCODE]

FIG. 8A

[AAUX PACK CONSTITUTION]

| TRACK NO. → | 1 | 2 | 3 | 4 | 5 | 6 | 7 | 8 | 9 | 10 |
|---|---|---|---|---|---|---|---|---|---|---|
| 8 | 75 |    |    |    |    |    |    |    | 75 |    |
| 7 | 74 |    |    |    |    |    |    |    | 74 |    |
| 6 | 73 |    |    |    |    |    |    |    | 73 |    |
| 5 | 72 | 75 | 75 | 75 | 75 | 75 | 75 | 75 | 72 | 75 |
| 4 | 71 | 74 | 74 | 74 | 74 | 74 | 74 | 74 | 71 | 74 |
| 3 | 70 | 73 | 73 | 73 | 73 | 73 | 73 | 73 | 70 | 73 |
| 2 |    | 72 | 72 | 72 | 72 | 72 | 72 | 72 |    | 72 |
| 1 |    | 71 | 71 | 71 | 71 | 71 | 71 | 71 |    | 71 |
| 0 |    | 70 | 70 | 70 | 70 | 70 | 70 | 70 |    | 70 |

↑ PACK NO.

70~75 : AAUX MAIN AREA

ACTUAL DATA IN OPTIONAL AREA : 120 BYTE

FIG. 8B

[SUBCODE AREA] (1 TRACK)

| SUB-CODE PRE-AMBLE | 1 SYNC ID DATA C | 2 SYNC ID DATA C | 3 SYNC ID DATA C | 4 SYNC ID DATA C | 5 SYNC ID DATA C | 6 SYNC ID DATA C | 7 SYNC ID DATA C | 8 SYNC ID DATA C | 9 SYNC ID DATA C | 10 SYNC ID DATA C | 11 SYNC ID DATA C | 12 SYNC ID DATA C | SUB-CODE POST-AMBLE |

▭ : MAIN AREA

[VAUX PACK CONSTITUTION]

SIMPLE MODE

FIG. 13

| | MSB | | | | | | | LSB |
|---|---|---|---|---|---|---|---|---|
| PC 0 | | | | | | | | |
| PC 1 | | | | | | | | |
| PC 2 | | | | | | | | |
| PC 3 | | | | | | | | |
| PC 4 | | | | | | | | |

FIG. 14A

TP HEADER (TOPIC/PAGE HEADER)

| | MSB | | | | | | | |
|---|---|---|---|---|---|---|---|---|
| PC 0 | 0 | 0 | 0 | 0 | 0 | 1 | 1 | 1 |
| PC 1 | LANGUAGE TAG | | | | TOPIC TAG | | | |
| PC 2 | RE | | TENS OF LPU | | | UNITS OF LPU | | |
| PC 3 | DM | SCRL | H/V | INIT | RASTER COLOR | | | |
| PC 4 | 1 | TENS OF PU NO. | | | UNITS OF PU NO. | | | |

FIG. 14B

CONTROL TEXT HEADER

| | MSB | | | | | | | LSB |
|---|---|---|---|---|---|---|---|---|
| PC 0 | 0 | 0 | 0 | 0 | 1 | 0 | 0 | 0 |
| PC 1 | | | | T D P | | | | |
| PC 2 | TEXT TYPE | | | | | | | |
| PC 3 | TEXT CODE | | | | | | | |
| PC 4 | AREA NO. | | | TOPIC TAG | | | | |

FIG. 14C

CONTROL TEXT

| | MSB | | | | | | | LSB |
|---|---|---|---|---|---|---|---|---|
| PC 0 | 0 | 0 | 0 | 0 | 1 | 0 | 0 | 1 |
| PC 1 | | | | | | | | |
| PC 2 | | | | | | | | |
| PC 3 | | | | | | | | |
| PC 4 | | | | | | | | |

FIG. 15A

TITLE START

|      | MSB |   |   |   |   |   |   | LSB |
|------|-----|---|---|---|---|---|---|-----|
| PC 0 | 0   | 0 | 0 | 1 | 1 | 0 | 1 | 1   |
| PC 1 | ---------------------------→LSB | | | | | | | 1 |
| PC 2 | ------------------- TRACK NO. ------------------- | | | | | | | |
| PC 3 | MSB ←------------------ (BINARY) ------------------ | | | | | | | |
| PC 4 | TEXT | GENRE CATEGORY | | | | | | |

FIG. 15B

TITLE END

|      | MSB |   |   |   |   |   |   | LSB |
|------|-----|---|---|---|---|---|---|-----|
| PC 0 | 0   | 0 | 0 | 1 | 1 | 1 | 1 | 1   |
| PC 1 | ---------------------------→LSB | | | | | | | 1 |
| PC 2 | ------------------- TRACK NO. ------------------- | | | | | | | |
| PC 3 | MSB ←------------------ (BINARY) ------------------ | | | | | | | |
| PC 4 | PB | 1 | 1 | 1 | 1 | 1 | 1 | 1 |

FIG. 15C

CHAPTER START

|      | MSB |   |   |   |   |   |   | LSB |
|------|-----|---|---|---|---|---|---|-----|
| PC 0 | 0   | 0 | 1 | 0 | 1 | 0 | 1 | 1   |
| PC 1 | ---------------------------→LSB | | | | | | | 1 |
| PC 2 | ------------------- TRACK NO. ------------------- | | | | | | | |
| PC 3 | MSB ←------------------ (BINARY) ------------------ | | | | | | | |
| PC 4 | TEXT | GENRE CATEGORY | | | | | | |

FIG. 15D

CHAPTER END

|      | MSB |   |   |   |   |   |   | LSB |
|------|-----|---|---|---|---|---|---|-----|
| PC 0 | 0   | 0 | 1 | 0 | 1 | 1 | 1 | 1   |
| PC 1 | ---------------------------→LSB | | | | | | | 1 |
| PC 2 | ------------------- TRACK NO. ------------------- | | | | | | | |
| PC 3 | MSB ←------------------ (BINARY) ------------------ | | | | | | | |
| PC 4 | PB | 1 | 1 | 1 | 1 | 1 | 1 | 1 |

FIG. 16A

TITLE TEXT HEADER

| | MSB | | | | | | | LSB |
|---|---|---|---|---|---|---|---|---|
| PC 0 | 0 | 0 | 0 | 1 | 1 | 0 | 0 | 0 |
| PC 1 | colspan=8 | T D P |||||||
| PC 2 | TEXT TYPE |||| |||| |
| PC 3 | TEXT CODE ||||||||
| PC 4 | ||||||||

FIG. 16B

TITLE TEXT

| | MSB | | | | | | | LSB |
|---|---|---|---|---|---|---|---|---|
| PC 0 | 0 | 0 | 0 | 1 | 1 | 0 | 0 | 1 |
| PC 1 | | | | | | | | |
| PC 2 | | | | | | | | |
| PC 3 | | | | | | | | |
| PC 4 | | | | | | | | |

FIG. 16C

CHAPTER TEXT HEADER

| | MSB | | | | | | | LSB |
|---|---|---|---|---|---|---|---|---|
| PC 0 | 0 | 0 | 1 | 0 | 1 | 0 | 0 | 0 |
| PC 1 | T D P ||||||||
| PC 2 | TEXT TYPE |||| |||| |
| PC 3 | TEXT CODE ||||||||
| PC 4 | ||||||||

FIG. 16D

CHAPTER TEXT

| | MSB | | | | | | | LSB |
|---|---|---|---|---|---|---|---|---|
| PC 0 | 0 | 0 | 1 | 0 | 1 | 0 | 0 | 1 |
| PC 1 | | | | | | | | |
| PC 2 | | | | | | | | |
| PC 3 | | | | | | | | |
| PC 4 | | | | | | | | |

FIG. 17A

VAUX TEXT HEADER

| | MSB | | | | | | | |
|---|---|---|---|---|---|---|---|---|
| PC 0 | 0 | 1 | 1 | 0 | 1 | 0 | 0 | 0 |
| PC 1 | TDP ||||||||
| PC 2 | TEXT TYPE | | | | | | | |
| PC 3 | TEXT CODE ||||||||
| PC 4 | | | | | | | | |

FIG. 17B

VAUX TEXT

| | MSB | | | | | | | LSB |
|---|---|---|---|---|---|---|---|---|
| PC 0 | 0 | 1 | 1 | 0 | 1 | 0 | 0 | 1 |
| PC 1 | | | | | | | | |
| PC 2 | | | | | | | | |
| PC 3 | | | | | | | | |
| PC 4 | | | | | | | | |

FIG. 17C

TELE TEXT

| | MSB | | | | | | | LSB |
|---|---|---|---|---|---|---|---|---|
| PC 0 | 0 | 1 | 1 | 0 | 0 | 1 | 1 | 1 |
| PC 1 | | | | | | | | |
| PC 2 | | | | | | | | |
| PC 3 | | | | | | | | |
| PC 4 | | | | | | | | |

TAPE TOP                                                TAPE END

| CHAPTER1 | CHAPTER2 | CHAPTER3 | ............ | CHAPTER10 |
|---|---|---|---|---|
| ST1   ET1 | ST2   ET2 | ST3   ET3 | ST4      ET9 | ST10   ET10 |

| (B) | | | (C) | (D) |
|---|---|---|---|---|
| START POSITION | END POSITION | CHAPTER NAME | PB FLAG | PB FLAG |
| ST 1 | ET 1 | CHAPTER1 | 0 | 1 |
| ST 2 | ET 2 | CHAPTER2 | 1 | 0 |
| ST 3 | ET 3 | CHAPTER3 | 1 | 1 |
| ⋮ | ⋮ | ⋮ | ⋮ | ⋮ |
| ST 10 | ET 10 | CHAPTER10 | 1 | 1 |

FIG. 21

| PACK NAME | CODE | CONTENTS |
|---|---|---|
| TP HEADER | 07<br>00<br>01(81)<br>68<br>81 | LANGUAGE TAG = 0 / TOPIC TAG = 0<br>→ TOTAL NUMBER OF PAGE UNIT = 1<br>* 24 CHARACTERS x 12 LINES<br>→ * SUPER FIXED DISPLAY / *INITIALIZES<br>→ PAGE UNIT NO. 1           DISPLAY |
| CONTROL TEXT HEADER | 08<br>00<br>01<br>80<br>A1 | } TEXT PACK NUMBER = 5, TEXT TU<E + NAME<br>→ TELETEXT COMPATIBLE CODE<br>→ RECORD AREA = SUBCODE, TOPIC TAG = 1 |
| CONTROL TEXT | 09<br>1B<br>24<br>42<br>1B | } INDICATE KANJI CODE SET |
| CONTROL TEXT | 09<br>29<br>30<br>1B<br>2A | → INDICATE HIRAGANA CODE SET |
| CONTROL TEXT | 09<br>4A<br>1B<br>2B<br>20 | → INDICATE ALPHANUMERIC CODE SET<br><br>→ INDICATE MACRO CODE SET |
| CONTROL TEXT | 09<br>70<br>0F<br>1B<br>7D | → LS0 (CALL KANJI CODE SET)<br>} → LS2R (CALL ALPHANUMERIC CODE SET) |
| CONTROL TEXT "T","O" "C",NULL | 09<br>D4<br>CF<br>C3<br>00 | → T<br>→ O<br>→ C<br>→ NULL |
| CONTROL TEXT HEADER | 08<br>00<br>02<br>80<br>82 | } TEXT PACK NUMBER = 2, TEXT TYPE = NAME<br>→ TELETEXT COMPATIBLE CODE<br>→ RECORD AREA = AAUX<br>TOPIC TAG = 2 |
| CONTROL TEXT "S","T" "A","F" | 09<br>D3<br>D4<br>C1<br>C6 | → S<br>→ T<br>→ A<br>→ F |
| CONTROL TEXT "F",NULLx3 | 09<br>C6<br>00<br>00<br>00 | → F<br>} → NULL x 3 |
| CONTROL TEXT HEADER | 08<br>00<br>03<br>80<br>03 | } TEXT PACK NUMBER = 2, TEXT TYPE = NAME<br>→ TELETEXT COMPATIBLE CODE<br>→ RECORD AREA = AAUX<br>TOPIC TAG = 3 |
| CONTROL TEXT "カ","ラ" | 09<br>25<br>2B<br>25<br>69 | } → KA<br>} → RA |
| CONTROL TEXT "オ","ケ" | 09<br>25<br>2A<br>25<br>31 | } → O<br>} → KE |

(TEXT UNIT grouping on the left encompasses the Control Text Header and Control Text rows for each of the three text units.)

SETTING CODE TABLE

GROUP OF CODES SETS (2 BYTES)

GROUP OF CODES SETS (1 BYTE)

F : TERMINAL CODE (FOR CHARACTER CODE SET)
LS2 : ESC 06/14
LS3 : ESC 06/15
LS1R : ESC 07/14
LS2R : ESC 07/13
LS3R : ESC 07/12

EXTENSION OF CODE

FIG. 23A

CALL CODE

| CALL CODE | | ABBREV | OPERATION |
|---|---|---|---|
| 00/15 | (0Fh) | LS0 | CALL GO TO G1 BY LOCKING SHIFT |
| 00/14 | (0Eh) | LS1 | G1 GL |
| 00/11, 06/14 | (1Bh, 6Eh) | LS2 | G2 GL |
| 00/11, 06/15 | (1Bh, 6Fh) | LS3 | G3 GL |
| 00/11, 07/14 | (1Bh, 7Eh) | LS1R | G1 GR |
| 00/11, 07/13 | (1Bh, 7Dh) | LS2R | G2 GR |
| 00/11, 07/12 | (1Bh, 7Ch) | LS3R | G3 GR |
| 01/9 | (19h) | SS2 | G2 GL BY SINGLE SHIFT |
| 01/13 | (1Dh) | SS3 | G3 GL " |

FIG. 23B

INDICATION CODE

| INDICATION CODE | OPERATION |
|---|---|
| 01/11, 02/8, F (1Bh, 28h, F)<br>01/11, 02/9, F (1Bh, 29h, F)<br>01/11, 02/10, F (1Bh, 2Ah, F)<br>01/11, 02/11, F (1Bh, 2Bh, F) | INDICATE GO FOR 1-BYTE CHARACTER CODE SET DESIGNATED BY TERMINAL CODE (F) |
| 01/11, 02/4, F (1Bh, 24h, F)<br>01/11, 02/4, 02/9, F (1Bh, 24h, 29h, F)<br>01/11, 02/4, 02/10, F (1Bh, 24h, 2Ah, F)<br>01/11, 02/4, 02/11, F (1Bh, 24h, 2Bh, F) | INDICATE GO FOR 2-BYTE CHARACTER CODE SET DESIGNATED BY TERMINAL CODE (F) |
| 01/11, 02/8, 02/0, F (1Bh, 28h, 20h, F)<br>01/11, 02/9, 02/0, F (1Bh, 29h, 20h, F)<br>01/11, 02/10, 02/0, F (1Bh, 2Ah, 20h, F)<br>01/11, 02/11, 02/0, F (1Bh, 2Bh, 20h, F) | INDICATE GO FOR 1-BYTE DRCS SET DESIGNATED BY TERMINAL CODE (F) |

FIG. 24A

| TERMINAL CODE (F) | | CHARACTER CODE SET | CODE |
|---|---|---|---|
| 04/2 | (42h) | KANJI AND DJCS | (2 BYTE) |
| 04/10 | (4Ah) | ALPHANUMERIC | (1 BYTE) |
| 03/0 | (30h) | HIRAGANA | (1 BYTE) |
| 03/1 | (31h) | KATAKANA | (1 BYTE) |
| 04/1 | (41h) | DRCS - 1 | (1 BYTE) |
| 04/2 | (42h) | DRCS - 2 | (1 BYTE) |
| 04/3 | (43h) | DRCS - 3 | (1 BYTE) |
| 04/4 | (44h) | DRCS - 4 | (1 BYTE) |
| 04/5 | (45h) | DRCS - 5 | (1 BYTE) |
| 04/6 | (46h) | DRCS - 6 | (1 BYTE) |
| 04/7 | (47h) | DRCS - 7 | (1 BYTE) |
| 04/8 | (48h) | DRCS - 8 | (1 BYTE) |
| 04/9 | (49h) | DRCS - 9 | (1 BYTE) |
| 04/10 | (4Ah) | DRCS - 10 | (1 BYTE) |
| 04/11 | (4Bh) | DRCS - 11 | (1 BYTE) |
| 04/12 | (4Ch) | DRCS - 12 | (1 BYTE) |
| 04/13 | (4Dh) | DRCS - 13 | (1 BYTE) |
| 04/14 | (4Eh) | DRCS - 14 | (1 BYTE) |
| 04/15 | (4Fh) | DRCS - 15 | (1 BYTE) |
| 07/0 | (70h) | MACRO CODE SET | (1 BYTE) |

TERMINAL CODE

FIG. 24B

| | CHARACTER COLOR DESIGNATION CONTROL CODE | BACKGROUND COLOR |
|---|---|---|
| BLACK | 08/0 (80h) | 09/0, 05/0 (90h, 50h) |
| RED | 08/1 (81h) | 09/0, 05/1 (90h, 51h) |
| GREEN | 08/2 (82h) | 09/0, 05/2 (90h, 52h) |
| YELLOW | 08/3 (83h) | 09/0, 05/3 (90h, 53h) |
| BLUE | 08/4 (84h) | 09/0, 05/4 (90h, 54h) |
| Mg | 08/5 (85h) | 09/0, 05/5 (90h, 55h) |
| Cy | 08/6 (86h) | 09/0, 05/6 (90h, 56h) |
| WHITE | 08/7 (87h) | 09/0, 05/7 (90h, 57h) |
| | 09/0, 04/8 (90h, 48h) | 09/0, 05/8 (90h, 58h) |

COLOR DESIGNATION CONTROL CODE

| RASTER COLOR DESIGNATION CONTROL CODE | | |
|---|---|---|
| 0 | | |
| 1 | H/I | 9 A/J |
| 2 | I/G/M | A B/K |
| 3 | 3 H | B C/L |
| 4 | I | C D/M |
| 5 | A/Z | D E/N |
| 6 | C/O | E F/O |
| 7 | E/F | F |
| 8 | | |

FIG. 24C

| CONTROL CODE | OPERATION |
|---|---|
| 08/10 (8Ah) | SELECT FULL ANGLE (STANDARD) CHARACTER SIZE |
| 08/9 (89h) | SELECT HALF ANGLE (STANDARD) CHARACTER SIZE |
| 08/11, 04/1 (8Bh, 41h) | DOUBLE FULL ANGLE CHARACTER SIZE VERTICALLY |
| 08/11, 04/4 (8Bh, 44h) | DOUBLE FULL ANGLE CHARACTER SIZE HORIZONTALLY |
| 08/11, 04/5 (8Bh, 45h) | DOUBLE FULL ANGLE CHARACTER SIZE BOTH VERTICALLY AND HORIZONTALLY |

CONTROL CODE FOR DESIGNATING CHARACTER SIZE OF 1-CHARACTER UNIT

FIG. 25B

OPERATING POSITION CONTROL CODE

| | CONTROL CODE | ABBREV | OPERATION |
|---|---|---|---|
| 1 | 00/9 (09h) | APF | ADVANCE OPERATING POSITION BY 1 SEGMENT |
| 2 | 01/6 , N1 (16h, N1) | PAPF | ADVANCE OPERATING POSITION BY N1 SEGMENT |
| 3 | 00/8 (08h) | APB | RETREAT OPERATING POSITION BY 1 SEGMENT |
| 4 | 00/10 (0Ah) | APD | ADVANCE OPERATING POSITION BY 1 STEP |
| 5 | 00/11 (0Bh) | APU | RETREAT OPERATING POSITION BY 1 STEP |
| 6 | 00/13 (0Dh) | APR | FEED OPERATING POSITION TO NEXT LINE |
| 7 | 01/12, N1, N2 (1Ch, N1, N2) | APS | SET OPERATING POSITION |

※APS  REFERENCE POINT OF APS IS (0,0), NOT THE CURRENT OPERATING POSITION

※  PARAMETERS N1+N2 ARE IN A RANGE OF 40-7F TO DESIGNATE 0-63 IN FIG.25A SHOWING THE OPERATION PATTERN, EXAMPLE 2 IS BASED ON PAPF, 42, AND EXAMPLE 7 BASED ON APS, 44, 41

F I G. 26

| TIME CONTROL (DELAY) CODE | OPERATION |
|---|---|
| 09/13, 02/0, N2 (9Dh, 20h, N2) | INTERRUPT THE DISPLAY PROCESS FOR THE TIME DESIGNATED BY THE PARAMETER. (PARAMETER N2 IS IN A RANGE OF 40-7F TO DESIGNATE 0-63 UNIT = 0.1 SECOND) |

FIG. 27

| | | | |
|---|---|---|---|
| | TP HEADER | 07<br>01<br>81<br>68<br>80 | → LANGUAGE TAG = 0; TOPIC TAG = 1<br>LAST PAGE UNIT NO. 1<br>→ SUPER FIXED DISPLAY / INITIALIZES DISPLAY<br>→ PAGE UNIT NO. = 0   TO 24×12 LINES |
| P<br>O<br>S<br>I<br>T<br>I<br>O<br>N | TITLE START | 1B<br>7F | → TRACK NO. AT TITLE START POINT<br>→ TEXT INFORMATION EXISTENT |
| | TITLE END | 1F<br>7F | → TRACK NO. AT TITLE END POINT<br>→ PB FLAG = 0 |
| | CHAPTER START | 2B<br>FF | → TRACK NO. AT START POINT<br>→ NO TEXT INFORMATION OF CHAPTER 1 |
| | CHAPTER END | 2F<br>7F | → TRACK NO. AT END POINT OF CHAPTER 1<br>→ PB FLAG = 0 |
| | CHAPTER START | 2B<br>7F | → TRACK NO. AT START POINT OF CHAPTER 2<br>→ TEXT INFORMATION EXISTENT |
| | CHAPTER END | 2F<br>FF | → TRACK NO. AT END POINT OF CHAPTER 2<br>→ PB FLAG = 1 |
| | TP HEADER | 07<br>01<br>81<br>68<br>81 | → LANGUAGE TAG = 0; TOPIC TAG = 1<br>→ SUPER FIXED DISPLAY<br>→ PAGE UNIT NO. = 1 |
| T<br>E<br>X<br>T<br>U<br>N<br>I<br>T | TITLE TEXT HEADER | 18<br>00<br>02<br>80<br>FF | } TEXT PACK = 2   TEXT TYPE = NAME<br>→ TELETEXT COMPATIBLE CODE<br>→ NO INFORMATION |
| | TITLE TEXT "S", "O" "M", "E" | 19<br>53<br>4F<br>4D<br>45 | → S<br>→ O<br>→ M<br>→ E |
| | TITLE TEXT "D", "A", "Y", NULL | 19<br>44<br>41<br>59<br>00 | → D<br>→ A<br>→ Y<br>→ NULL |
| T<br>E<br>X<br>T<br>U<br>N<br>I<br>T | CHAPTER TEXT HEADER | 28<br>00<br>02<br>80<br>FF | } TEXT PACK NO. = 2   TEXT TYPE = NAME<br>→ TELETEXT COMPATIBLE CODE<br>→ NO INFORMATION |
| | CHAPTER TEXT "S", "o", "␣", "y" | 29<br>53<br>6F<br>20<br>79 | → S<br>→ o<br>→ ␣<br>→ y |
| | CHAPTER TEXT "o", "u" "n", "g" | 29<br>6F<br>75<br>6E<br>6F | → o<br>→ u<br>→ n<br>→ g |

FIG. 29

| | | |
|---|---|---|
| VAUX TEXT HEADER | 68 00 16 80 FF | } TEXT PACK NO.=6, TEXT TYPE = COMMENT<br>→ TEXT COMPATIBLE CODE<br>→ NO INFORMATION |
| VAUX TEXT ESC,24,42, LS0 | 69 1B 24 42 0F | } ESC,24,42 (INDICATE KANJI CODE SET)<br>→ LOCKING SHIFT 0 (CALL KANJI CODE SET) |
| VAUX TEXT | 69 24 2A 24 62 | } → O (HIRAGANA)<br>} → MO (HIRAGANA) |
| VAUX TEXT | 69 24 24 24 43 | } → I (HIRAGANA)<br>} → TSU (HIRAGANA) |
| VAUX TEXT | 69 24 2D 24 6A | } → KI (HIRAGANA)<br>} → RI (HIRAGANA) |
| VAUX TEXT | 69 25 46 25 60 | } → TE (KATAKANA)<br>} → RE (KATAKANA) |
| VAUX TEXT ,NULL×2 | 69 25 53 00 00 | } → BI (KATAKANA)<br>} → NULL×2 |
| VAUX TEXT HEADER | 68 00 24 80 FF | } → TEXT PACK NO.=4, TEXT TYPE = STATION<br>→ TELETEXT COMPATIBLE CODE<br>→ NO INFORMATION |
| VAUX TEXT ESC,24,42, LS0 | 69 1B 24 42 0F | } → ESC,24,42 (INDICATE KANJI CODE SET)<br>→ LOCKING SHIFT 0 (CALL KANJI CODE SET) |
| VAUX TEXT | 69 46 7C 4B 5C | } → NI (KANJI)<br>} → HON (KANJI) |
| VAUX TEXT | 69 25 46 25 6C | } → TE (KATAKANA)<br>} → RE (KATAKANA) |
| VAUX TEXT ,NULL×2 | 69 25 53 00 00 | } → BE (KATAKANA)<br>} → NULL×2 |

5,646,796

1

APPARATUS AND METHOD FOR RECORDING AND REPRODUCING TOPIC DATA WITH DIGITAL VIDEO AND AUDIO DATA

BACKGROUND OF THE INVENTION

The present invention relates to a digital video tape recorder and, more particularly, to apparatus for recording and reproducing digital video and audio signals with menu and topic data including table of content data.

Digital video tape recorders which record and reproduce video and audio signals in coded form in tracks on a record medium are known in the art. It is also known to record auxiliary information in a sub-code area of each track. The auxiliary information may represent character information indicative of, for example, a title or recording date of the video and audio signals which have been recorded on the record medium. One example of such a system is disclosed in European Patent Application No. 0,561,281.

However, there is a present need for a digital video tape recorder which is capable of displaying a "menu" of the auxiliary information recorded on the record medium, thus providing an easy mechanism for selecting auxiliary information to be utilized. Existing digital tape recorders do not provide for such a menu. In addition, it would be advantageous to provide a table of contents of the programs and chapters stored on the record medium to facilitate automatic location and reproduction of a user-selected chapter.

Further, there is a present need for a digital video tape recorder to utilize a teletext signal in which alpha-numeric and graphic characters are broadcast. Such a system may, for example, automatically provide program title and other information about a transmitted program, and in addition, enhance the functionality of selecting a program or programs to be recorded at a future time by providing a television program list within the broadcast signal. The user may select from the list a desired program to be recorded. Existing devices do not contain such a feature.

Another shortcoming of existing digital video tape recorders is that all of the auxiliary information recorded on a track is reproduced even when less than all of the auxiliary information is needed, thus resulting in unnecessary reproductions, a need for large storage capacity and a slower response time.

OBJECTS OF THE INVENTION

Therefore, it is an object of the present invention to provide apparatus and method for recording and reproducing digital video and audio data which overcomes the shortcomings of existing devices.

Another object of this invention is to record and reproduce topic and table of content data with the video and audio data in order to provide easy selection of a recorded program or topic from the record medium.

A further object of the present invention is to utilize teletext character data supplied with the video and audio signal.

An additional object of the present invention is to provide apparatus of modest circuit size for recording and reproducing digital video and audio data.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method for recording digital video and audio data in tracks on a record medium operates to receive topic data with the digital video and audio data, produce menu data in accordance with identifying topics represented by the topic data. The video, audio and menu data are recorded in respective video, audio and sub-code areas, and the topic data is recorded in auxiliary areas of the video and audio areas.

As one aspect of the present invention, the menu data includes position data which indicates the respective areas of a track in which the topic data is located.

As another aspect of the present invention, table of content data is generated which identifies the contents of the data recorded in the video and audio areas of each track (e.g. the contents of the chapters/parts of a program recorded on the tape and the respective beginnings and endings of each chapter/part). The table of content data is post-recorded in the sub-code area of each track.

In accordance with another embodiment of the present invention, digital video data, digital audio data and character information are received from a teletext broadcast system. Auxiliary character data is generated from the received character information and the auxiliary character data is recorded in the auxiliary areas of the video and audio areas in the tracks.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 3A and 3B are schematic diagrams showing the format of the T-SYNC area of FIG. 2;

FIGS. 4A and 4B schematically illustrate the data structure of the audio area of a track and a sync block of the audio area, respectively, in accordance with the present invention;

FIGS. 6A to 6D illustrate the data structure of the video sync blocks, including the video auxiliary (VAUX) sync blocks of the video area shown in FIG. 5;

FIGS. 8A and 8B illustrate the data structure of a frame of audio pack data and the format of the sub-code area of FIG. 2, respectively;

FIG. 13 illustrates the data structure of a pack used as the basic building block in the video auxiliary (VAUX), audio auxiliary (AAUX) and sub-code data areas;

FIGS. 14A to 14C illustrate the data structure of a topic/page (TP) header pack, a control text header pack, and a control text pack, respectively;

FIGS. 15A to 15D illustrate the data structure of a title start pack, a title end pack, a chapter start pack, and a chapter end pack, respectively;

FIGS. 16A to 16D illustrate the data structure of a title text header pack, a title text pack, a chapter text header pack, and a chapter text pack, respectively;

FIGS. 17A to 17C illustrate the data structure of a VAUX text header pack, a VAUX text pack, and a teletext pack, respectively;

FIGS. 18A to 18D illustrate a record medium divided into a plurality of chapters;

FIG. 21 illustrates an example of topic data for the topic "MENU";

FIGS. 23A and 23B show call codes and indication codes, respectively, in the teletext compatible coding scheme;

FIGS. 24A to 24C show terminal codes, color designation control codes and character size designation control codes in the teletext compatible coding scheme;

FIGS. 25A and 25B illustrate operating-position control codes in the teletext compatible coding scheme;

FIG. 26 is a diagram explaining a time-controlled code in the teletext compatible coding scheme;

FIG. 27 illustrates an example of topic data for the topic "TOC";

FIG. 29 shows an example of pack data of topic data recorded in the simple mode;

DETAILED DESCRIPTION OF CERTAIN PREFERRED EMBODIMENTS

Figure 2:
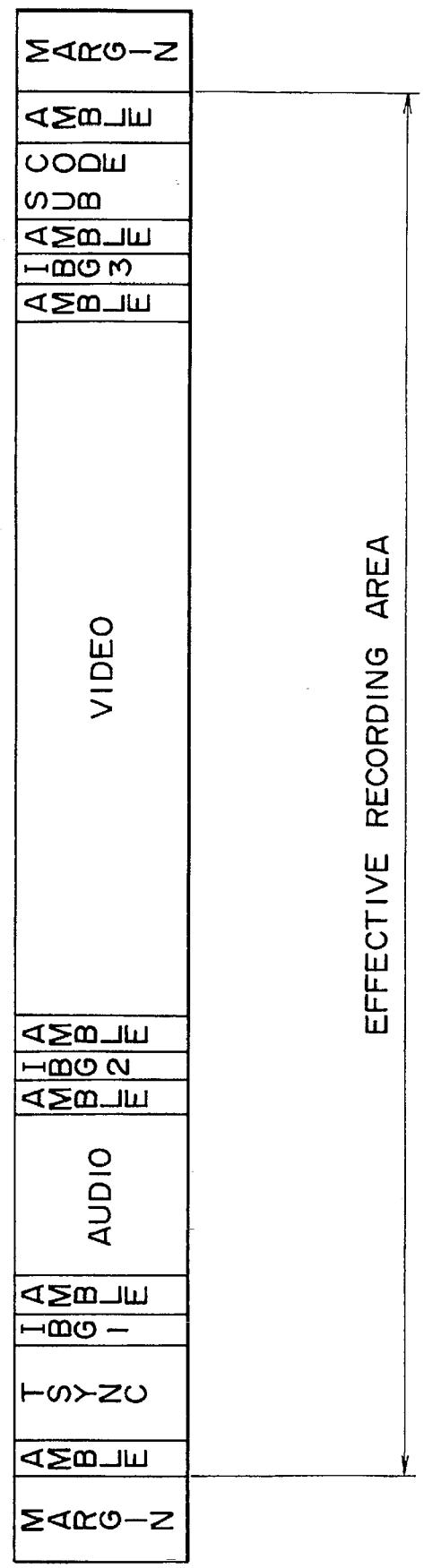
FIG. 2 is a schematic diagram showing the format of a single track recorded on and reproduced from the record medium by the present invention.

Referring now to the drawings, FIG. 2 schematically illustrates a preferred recording format of one track recorded on, for example, a record tape as a slant track. In a preferred embodiment, digital video data is recorded in this track, wherein margins to accommodate an edit operation are provided at respective ends of the track. During recording of one track, a T-SYNC area is recorded at the beginning portion of the track followed by an audio area, a video area and a sub-code area. Between the four recorded areas, inter-block gaps (IBG 1-3) are formed. Further, the T-SYNC, audio, video and sub-code areas each contain a preamble area at the beginning and a postamble area at the end of the respective area. The preambles and postambles prevent data from remaining unerased when re-recording of data on this track occurs.

FIGS. 3A and 3B show in greater detail the T-SYNC area in one recording track. As shown in FIG. 3A, the T-SYNC area is composed of 53 SYNC blocks, each SYNC block includes 6 bytes of data, for a total of 318 bytes in each T-SYNC area. As shown in FIG. 3B, each SYNC block includes 2 bytes of synchronizing (SYNC) data, 3 bytes of identification data (ID0, ID1 and IDP (parity)), and 1 byte of dummy data. A servo-signal (i.e. ATF signal) may be written in part of or the entire T-SYNC area of a track.

The data structure of the audio area of a track is illustrated in FIGS. 4A and 4B. As shown in FIG. 4A, the audio area contains 9 "audio SYNC blocks" and 5 "parity SYNC blocks". Each audio SYNC block, as depicted in FIG. 4B, includes 2 SYNC bytes and 3 identification (ID) bytes (ID0, ID1 and IDP), which comprise a 5 byte SYNC area, followed by a 5 byte audio auxiliary (AAUX) area for storing auxiliary data (described below). Following the AAUX area are 72 bytes of audio data and 8 bytes of C1 code (horizontal parity) for error correction. Thus, each audio SYNC block contains 90 bytes of data. The 5 parity SYNC blocks shown in FIG. 4A are comprised of "outer parity code", or vertical parity code C2, for error correction of the columns of bits depicted in FIG. 4A.

Figure 5:
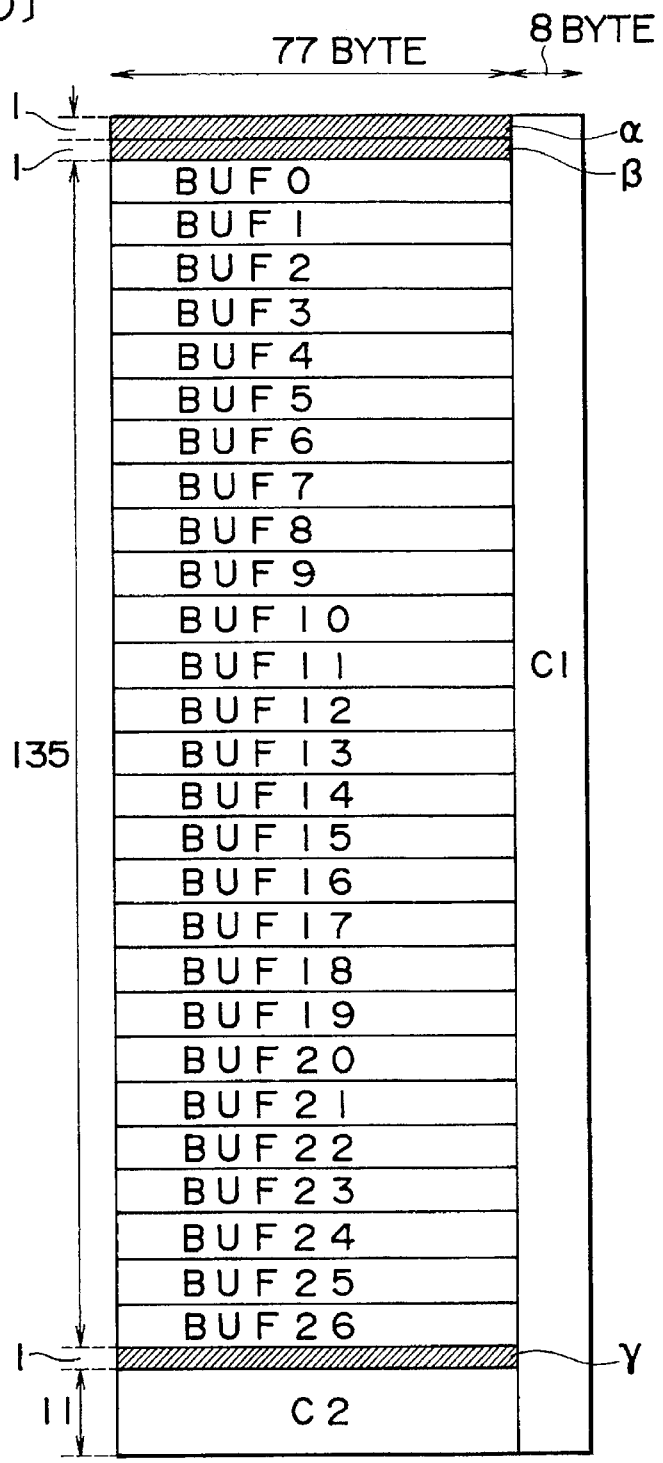
FIG. 5 schematically illustrates the data structure of the video area of a record track in accordance with the present invention.

The data structure of the video area of a track is illustrated in FIG. 5. The video area contains 2 video auxiliary (VAUX) SYNC blocks ($\alpha$ and $\beta$), 27 buffer blocks (BUF0–BUF26), a third VAUX SYNC block ($\gamma$) and 11 parity SYNC blocks of C2 code (outer parity). Each buffer block contains 5 video SYNC blocks for a total of 135 video SYNC blocks. Each of the above-described SYNC blocks is 90 bytes long, wherein the first 5 bytes of each SYNC block (not shown in FIG. 5) comprise a 5-byte SYNC area (2 bytes SYNC and 3 bytes ID) similar to that described in conjunction with the audio area. Each 5 byte SYNC area is followed by 77 bytes of video data and 8 bytes of C1 code (inner parity).

The data structure of the video area is described in greater detail with reference to FIGS. 6A to 6D. As shown in FIG. 6A, a buffer block comprises five video SYNC blocks, wherein each video SYNC block includes a 1-byte region Q for storing quantization data at the beginning of the video data area, followed by 76 bytes of video data and 8 bytes of C1 code. In addition, each video SYNC block contains a 5-byte SYNC area at the beginning as shown in FIG. 6C, for a total of 90 bytes in each video SYNC block.

FIG. 6B illustrates the data structure of the 1-byte region Q of each video sync block. In this region, quantization table numbers QNo0 to QNo3 are stored in the four least significant bits of region Q, and data SWP0 to SWP3, which denote switching points of the quantization tables, are stored in the four most significant bits of region Q.

Each VAUX SYNC block ($\alpha$, $\beta$ and $\gamma$) has the data structure shown in FIG. 6D, and includes a five byte SYNC area (2 SYNC bytes and 3 ID bytes), followed by a 77-byte VAUX area and an 8-byte C1 code area (for error correction). The VAUX area of each VAUX SYNC block contains auxiliary data and is further described below.

Figures 7A, 7B:
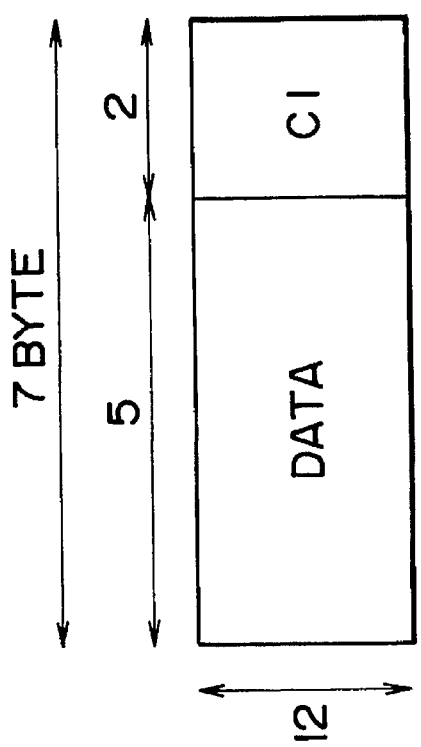
FIGS. 7A and 7B schematically illustrate the data structure of a sync block in the sub-code area shown in FIG. 2.

The data structure of the sub-code area of a track is illustrated in FIGS. 7A and 7B. The sub-code area contains 12 SYNC blocks, each containing a 5-byte data area followed by 2-bytes of C1 code, as depicted in FIG. 7A. In addition, each sub-code SYNC block includes, at its beginning, a 5-byte SYNC area (2 SYNC bytes and 3 ID bytes), shown in FIG. 7B. Thus, each sub-code SYNC block is composed of 12 bytes.

The data structure of the AAUX, VAUX and sub-code data areas of a track will now be described with reference to FIGS. 8–10. Each of these areas (AAUX, VAUX and sub-code data areas) are provided to record various auxiliary information, also known as system data. These areas are formed of "packs", each pack consisting of five bytes of data. Each AAUX SYNC block shown in FIG. 4B contains one pack of data since each AAUX SYNC block includes only a 5-byte AAUX area. The audio area of a track contains nine audio SYNC blocks (FIG. 4A), and thus can store nine packs of auxiliary data. Referring to FIG. 8A, there are nine packs, numbered 0 through 8, in each of the ten tracks shown. (In a preferred embodiment of the present invention, the data which is recorded in ten tracks on a magnetic tape comprise a signal frame in the NTSC system, while twelve tracks are used to record a single frame in the PAL system.) For purposes of describing the present invention, it will be assumed that the NTSC system is used, whereby ten tracks are used to record a single frame. In FIG. 8A, each track is shown to have nine packs of auxiliary data. Pack numbers 3–8 in odd numbered tracks (track numbers 1, 3, 5, 7 and 9) contain the numbers 70, 71, . . . 75, respectively and pack numbers 0–5 in even numbered tracks (track numbers 2, 4, 6, 8 and 10) also contain the numbers 70, 71, . . . 75, respectively. This area, i.e., those packs which contain a number, comprises the AAUX main area, while the other area, i.e., those packs that do not contain a number, comprises the AAUX optional area. The defined AAUX main area contains "basic" auxiliary data and the AAUX optional area contains other or "optional" auxiliary data. One purpose for having the above-described structure in the AAUX area is to prevent data from a single channel (e.g. tracks read by one head) from being lost due to a head failure. In addition, the above described pack structure copes with what has become known in the art as lateral scratch.

Figure 9:
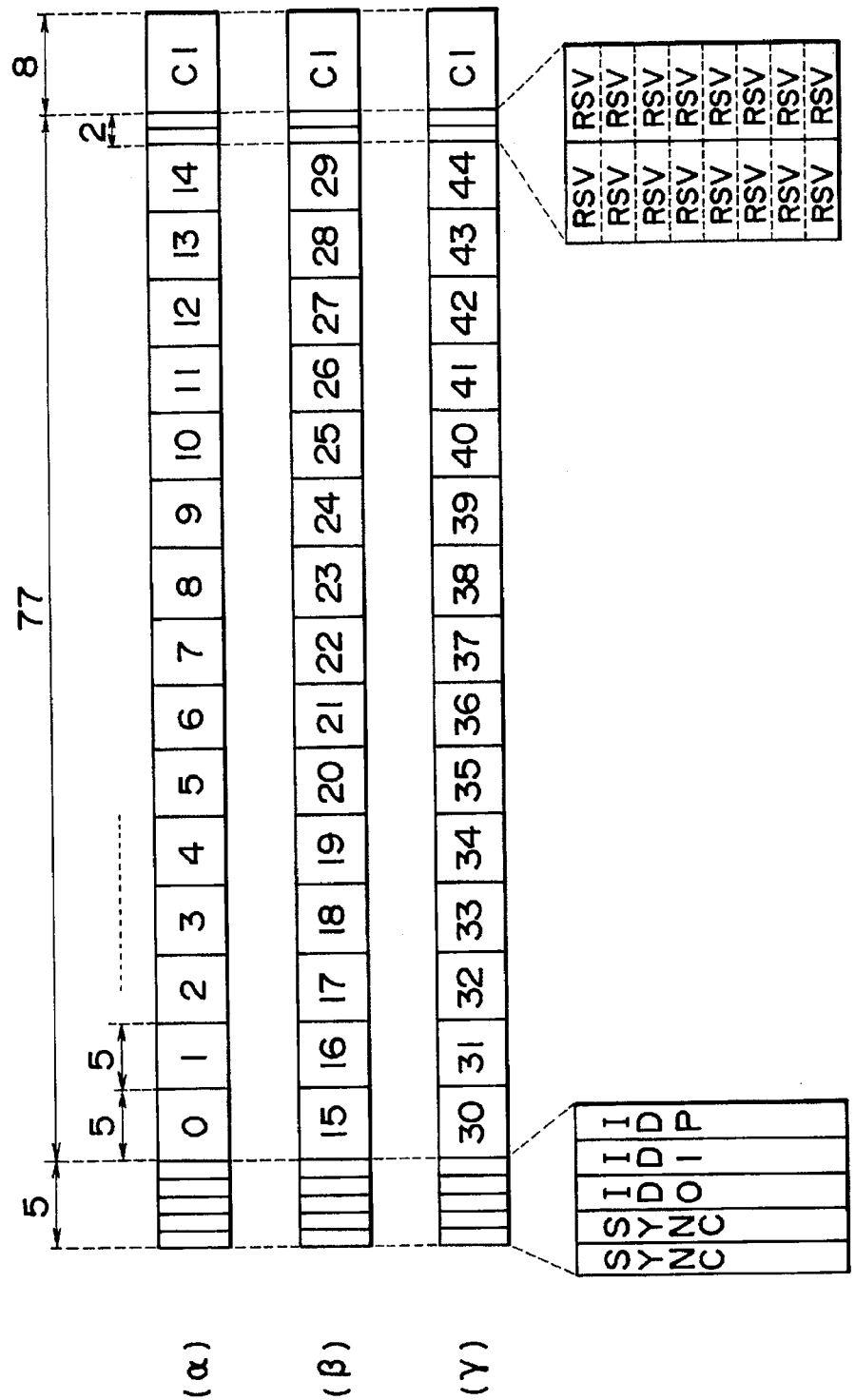
FIG. 9 illustrates the data structure of the video auxiliary (VAUX) sync blocks of the video area shown in FIG. 5.

FIG. 9 illustrates the data structure of the three VAUX SYNC blocks (α, β and γ). As shown, each VAUX SYNC block contains a 5-byte SYNC area, followed by a 77-byte VAUX area and an 8-byte area of C1 code. The 77-byte VAUX area of each VAUX SYNC block is divided into fifteen groups of 5 bytes each with the remaining two bytes being reserved for future use. Each 5-byte group in the VAUX area can store one pack of auxiliary data. Therefore, the three VAUX SYNC blocks in the video area of the track can store a total of 45 packs.

Figure 10:
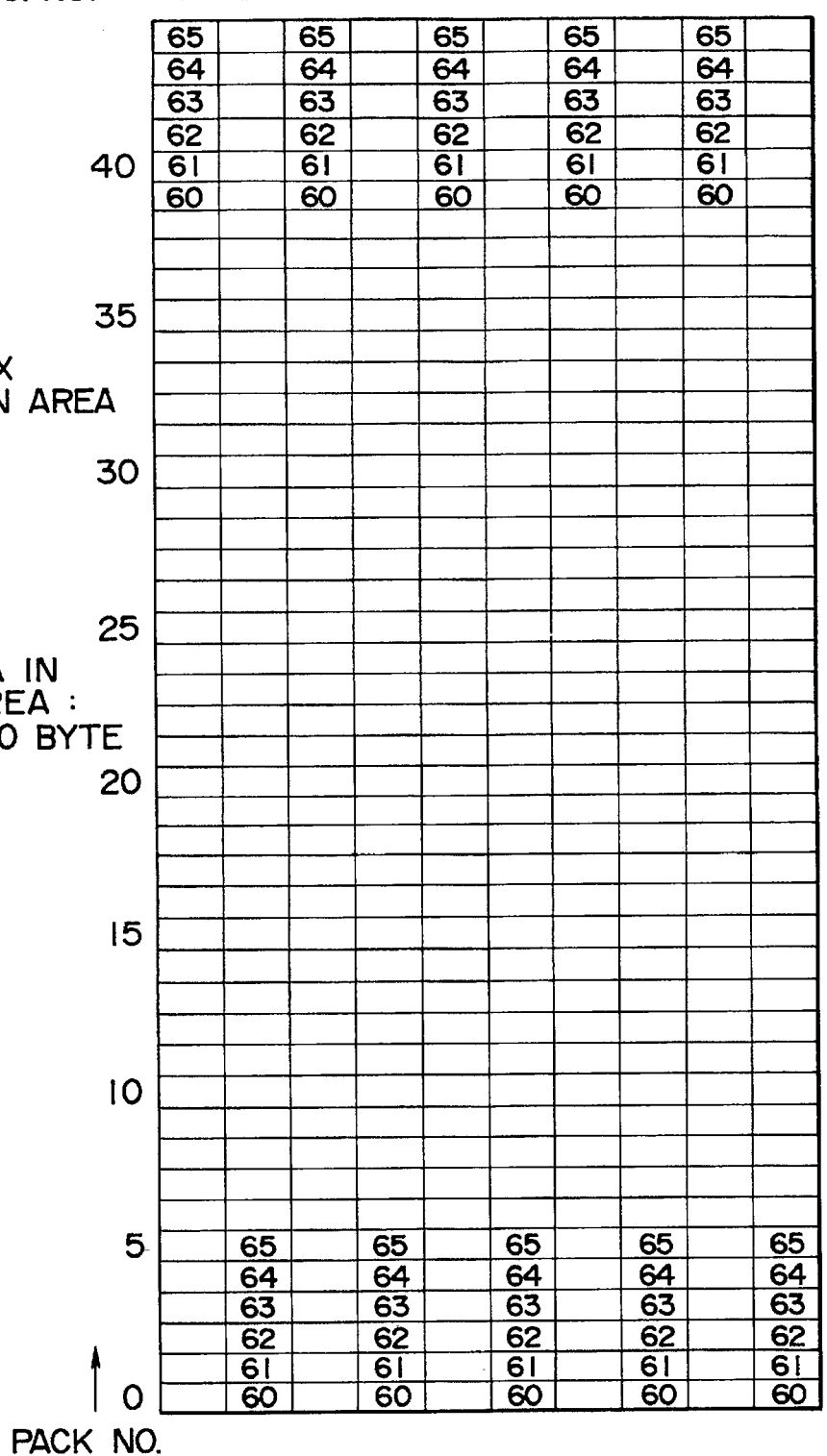
FIG. 10 is a table showing the structure of a frame of video pack data.

FIG. 10 illustrates the pack structure of the VAUX area of 10 tracks (one frame). Pack numbers 39–45 in odd numbered tracks and pack numbers 0–5 in even numbered tracks comprise the VAUX main area. The other packs, i.e., those that do not contain a number, comprise the VAUX optional area. Similar to the audio area, the VAUX main area contains the "basic" auxiliary data and the VAUX optional area contains other auxiliary data.

As discussed above with reference to FIG. 4, the sub-code area of a track contains twelve sub-code SYNC blocks, each having a 5-byte data area for storing one pack of auxiliary data. FIG. 8B illustrates the data structure of the sub-code area in one track. As shown, the SYNC blocks are numbered 1 to 12, where the data area in SYNC blocks 4–6 and 10–12 comprise the sub-code main area and the data areas in SYNC blocks 1–3 and 7–9 comprise the sub-code optional area.

The above-mentioned main areas of a track (i.e. AAUX main area, VAUX main area and sub-code main area) store fundamental auxiliary data which may be common to various magnetic tapes. Examples of fundamental auxiliary data stored in the AAUX main area of each track include the source of the recorded signal (e.g. channel number), the type of tuner which receives the signal that is recorded, the recording date (including time zone, day, week, month and year), and the recording time (hour, minute, second, frame number). Examples of fundamental data stored in the VAUX main area include data similar to that stored in the AAUX main area, and in addition, closed caption information. Examples of data stored in the sub-code main area include time codes indicating the beginning and ending of a title (e.g., title of the recorded program), chapter (e.g., chapters of the recorded program), and part (e.g., parts of a chapter of the recorded program), as well as date and time information.

As described above, data stored in the AAUX and VAUX main areas are located at alternating positions in the track in successive tracks. In addition, the same information may be recorded on multiple tracks in order to ensure a high degree of reproducibility of this data. Similarly, the same data stored in SYNC blocks 4–6 of the sub-code area may also be stored in SYNC blocks 10–12 in the sub-code area. Thus, the above-described data structure reduces reproduction errors caused by transverse flaws of the tape, or by a clogged head or by other conditions which may result in drop out of one of the channels.

In the above-described optional areas (AAUX optional area, VAUX optional area and sub-code optional area), auxiliary information may be freely stored by a manufacturer of pre-recorded tapes (sometimes known as "soft tapes") or by a consumer. Auxiliary information stored in the optional areas include, for example, alpha-numeric or graphic character information, character broadcast signal data (teletext data), television signal data that otherwise is present in a line in the vertical blanking period or scanning period of an analog video signal, and computer graphics. The auxiliary information is further described below.

In the apparatus and method for recording and reproducing digital video and audio data of the present invention, the aforementioned character information may be recorded in one of two modes: a full mode and a simple mode. The full mode includes the features of the simple mode and is adapted to record and process a greater amount of character data than the simple mode. Further, the full mode is primarily used with soft tapes (pre-recorded tapes), while the simple mode is primarily used with consumer generated tapes (e.g., blank tapes used by a consumer). A description of the full mode will be explained first, and a description of the simple mode follows.

In order to understand the description of the apparatus and method for recording and reproducing digital video and audio data in accordance with the present invention, the following terms are defined: The term "topic" refers to the type, or class, of data stored as packs in the audio, video and sub-code areas of a track; and the term "topic data" refers to the actual data stored as packs identified by the "topic," such that each topic has corresponding topic data.

One such topic is the topic "TOC", which represents a table of contents of the video and audio information recorded on the magnetic tape. That is, for the topic "TOC", the actual table of contents is recorded as the "topic data". Other examples of topics include "cast", which represents the cast of characters in the recorded program, "staff", "commentary" and "lyrics", all of which represent specific information concerning the recorded program.

Figures 11A, 11B:
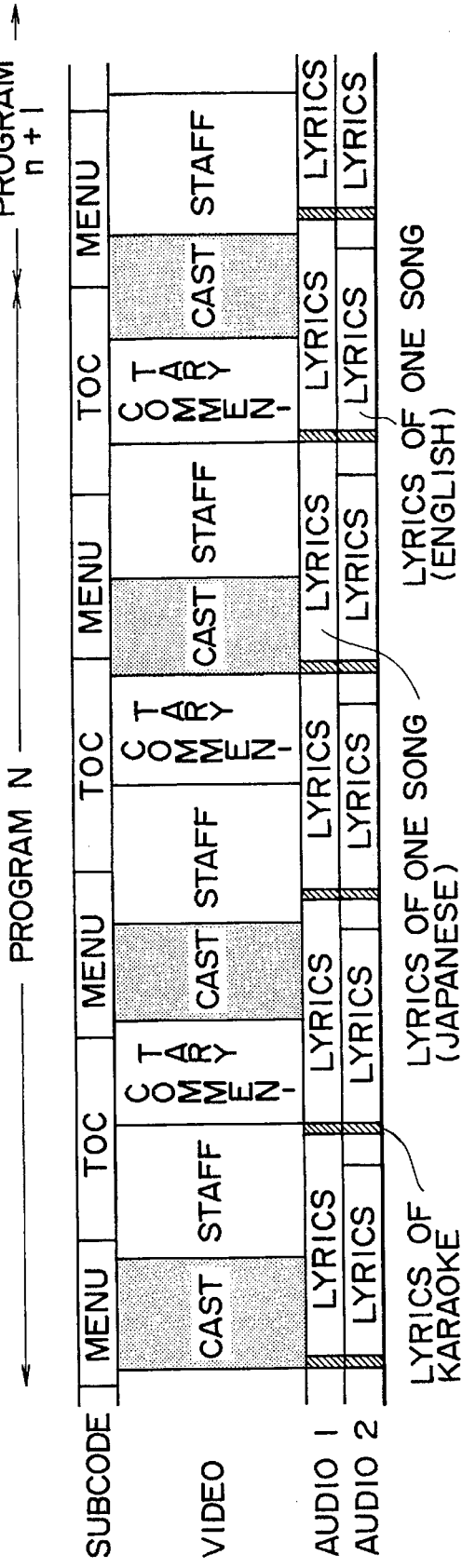
FIGS. 11A and 11B illustrate an example of menu data and topics recorded on the record medium, respectively.

In a preferred embodiment of the present invention, a menu is displayed on a video monitor at the request of the user (e.g., a viewer depresses a "menu" button on a remote control device). The displayed menu lists all of the topics recorded on the track on the magnetic tape currently positioned to be played back by the video tape recorder. Each topic has a topic number, known as a "topic tag", which is used to distinguish and identify topics. FIG. 11A illustrates an example of a menu generated from the data recorded in a track on the magnetic tape. As shown, the topics stored on this particular track include "menu", "TOC", "cast", "staff" and "lyrics", wherein each topic has an assigned topic tag for identifying the topic. The menu data (the topic data for the topic "menu") includes a record area for each of the topics which identifies the specific area in the track where topic data for a respective topic is located. As shown in FIG. 11A, the topic data for the topics "menu" and "TOC" are located in the sub-code area of the track, the topic data for the topics "cast" and "staff" are located in the VAUX area of the track and the topic data for the topic "lyrics" is located in the AAUX area of the track.

When the menu is displayed to a user, all of the topics except the topic "menu" are displayed; and the user may select one of the displayed topics. When a topic is selected, the video tape recorder of the present invention reproduces only that area of the track where the topic data for the selected topic is located and the topic data for the selected topic is then displayed to a user (described below). An advantage of the above-described process is that only a portion of the track is reproduced, instead of the entire track, thus achieving faster retrieval of the relevant information and ultimately providing faster display of the selected topic.

The topic "menu" has its own topic tag and recording area designation in order to provide a fast retrieval of the "menu" data for ultimate display to the user. The topics "menu" and "TOC" are designated as main topics and are assigned topic tags 0 and 1, respectively, since these topics exist on every soft tape and, preferably are stored in the sub-code area of each track.

The topics "cast", "staff" and "lyrics" are several examples of the types of topics that may be recorded on a track, and are designated as optional topics. Topic tags for optional topics are arbitrarily assigned; for example, the topic "cast" may be assigned a topic tag of 2 on one magnetic tape, and may be assigned a different topic tag on another magnetic tape. Optional topics whose topic data is recorded in the VAUX area of a track generally relate to or concern the video image, and optional topics whose topic data is recorded in the AAUX area of a track generally relate to or concern the audio information. Due to this flexible data structure, topic data is easily added to each track and provided for in the menu.

FIG. 11B schematically illustrates a portion of a magnetic tape having various topics recorded in the sub-code, video and audio regions of each track. It will be appreciated that FIG. 11B is not intended to illustrate the actual slant tracks recorded on the tape. As shown, the topic data for the main topics "menu" and "TOC" are recorded in the sub-code area, the topic data for the optional topics "cast", "staff" and "commentary" are recorded in the VAUX area of the video area, and the topic data for the optional topic "lyrics" is recorded in the AAUX area of the audio area of each track. Further, both English language and Japanese language lyrics are, for example, recorded as topic data for the topic "lyrics" (further described below). As an example, the topic "lyrics" refers to Karaoke lyrics, and when the Karaoke lyrics data (i.e., this topic data) are reproduced, the lyrics themselves are displayed as text on a display. It will be recognized that the displayed text corresponds to the audible language which also is reproduced. In this example, the topic data "lyrics" may constitute the entire lyrics of a song, whereas the topic data "Karaoke lyrics" constitute only that portion of a song being sung (for example, the lyrics of a few bars of music).

Figure 12A:
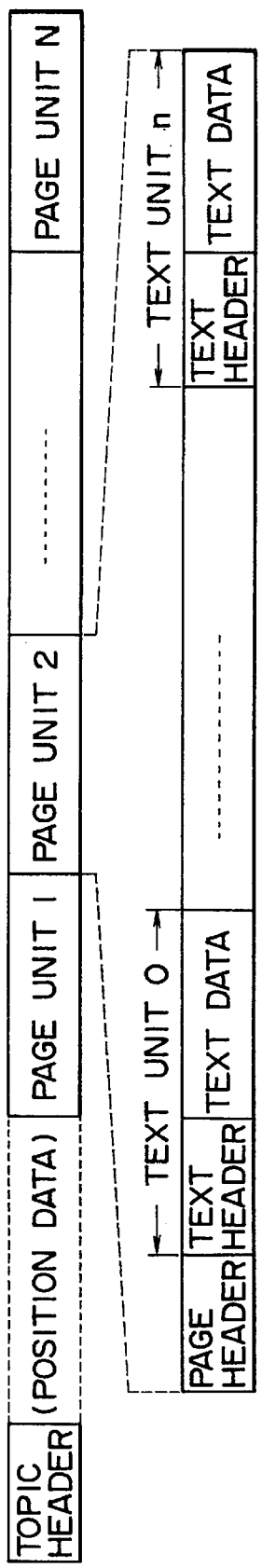
FIGS. 12A to 12C illustrate the data structure of topic data.

FIG. 12A illustrates the data structure of topic data stored in the AAUX, VAUX, and sub-code areas of a track. Each topic data includes a "topic header", which indicates the type of the topic data, followed by "position data", which identifies the tape position (described below). However, in the presently contemplated commercial embodiment, only topic data for the topic "TOC" (also referred to as "TOC data") contains "position data", whereby all other topic data has the same data structure without "position data", further described below. The position data generally is identified as page unit 0.

The "topic header" is followed by a sequence of "page units", beginning with page unit 1. Each page unit consists of a "page header" and a sequence of "text units", with each text unit including a "text header" which identifies the type of data stored in the "text data" that follows.

Each topic data has the data structure described above and is further structured such that a topic may be expressed in one language (e.g., Japanese) or another language (e.g., English) when topic information derived from this topic data is displayed to a user. Topic data in both languages (or several languages) may be recorded on the magnetic tape, and the user preferably selects a desired one of the stored languages. The "topic header" identifies each language by a "language tag", wherein a language having a language tag of 0 is designated as the main language, and languages having language tags other than 0 are optional languages.

Figure 12B:
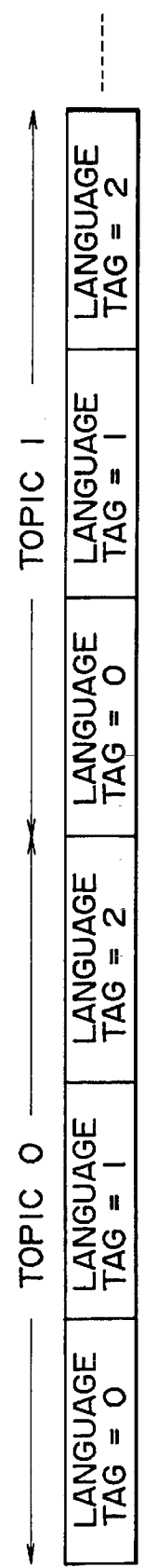

FIG. 12B illustrates the data structure of topic data of two topics. As shown, data of the same topic, that is, the same topic tag, are grouped together. Within data of the same topic, data is then ordered by its language tag, from the smallest language tag to the largest. Thus, data pertaining to topic 0 is grouped together and data with a language tag of 0 precedes data with a language tag of 1, etc.

In the above-described data structure of topic data, one topic header and one page header are stored in a single pack (i.e. 5 bytes of data), while position data (for the topic "TOC") and text header data generally consist of multiple packs, but may consist of only one pack of auxiliary data.

The data structure of the five byte pack will now be described with reference to FIGS. 13–17. Each pack in the AAUX, VAUX and sub-code data areas of a track is formed of five bytes as illustrated in FIG. 13. The first byte (PC0) of a pack is the "item data", which identifies the type of auxiliary data represented by the following four bytes (PC1–4). The item data (PC0) is divided into the upper 4 bits, referred to as the "major item", and the lower 4 bits, referred to as the "minor item". The major item identifies the group to which the auxiliary data pertains and the minor item identifies the specific information that is contained within the following four bytes within the specified group. For example, the major item may designate the group: control data (0000), title data (0001), chapter data (0010), part data (0011), program data (0100), line data (0101), video auxiliary data (0110) or audio auxiliary data (0111). The minor item then further specifies exactly what the data of the four subsequent bytes (PC1–PC4) represents. Examples of minor items of the control data group (0000) include cassette ID, tape length, topic/page header, text header and text; examples of minor items of the title data group (0001) include total time, remaining time, title start, title end, text header and text; and examples of minor items of the video auxiliary data (0110) and audio auxiliary data (0111) groups include source, recording date, recording time, text header and text, of which several of these packs are described below.

FIGS. 14A to 14C illustrate the data structure of a topic/page header pack, a control text header pack, and a control text pack, respectively. The topic/page header pack shown in FIG. 14A includes both topic header and page header information, and is present at the beginning of every topic data. The topic header designates the language tag and topic tag of the topic data in byte PC1, the content renew flag (RE) and the number of the last page unit in the topic data (TENS/UNITS OF LPU) in byte PC2 (see FIG. 12A). The page header indicates the current page unit number (TENS/UNITS OF PU No.) in byte PC4 to which the page header and the subsequent packs correspond.

The renew flag (RE) in byte PC2 is utilized to indicate when topic data for a specific topic has been "renewed" (i.e. updated), by having its value inverted each time the topic data is updated. For example, if topic data is changed because of a change of the chapter (even within the same topic), then this flag is utilized to indicate the change of the topic data. Therefore, when a topic is being displayed, only the topic data need be reproduced because there is no need to update the display of the information unless the RE flag is inverted, which then would require re-initializing the display.

Byte PC3 contains other auxiliary information, including a DM bit which indicates the maximum number of displayable characters per page, wherein a value of "0" denotes 24 characters×12 lines, and a value of "1" denotes 40 characters×24 lines. Further, an SCRL flag indicates whether the display is scrolled, and an H/V bit indicates the direction of the scroll. That is, for example, an SCRL value of "0" and an H/V value of 0 signifies an upward (vertical) scroll, an H/V value of "1" and an SCRL value of "0" signifies a 1-line leftward (horizontal) scroll, and an SCRL value of "1" indicates no scroll.

Figure 25A:
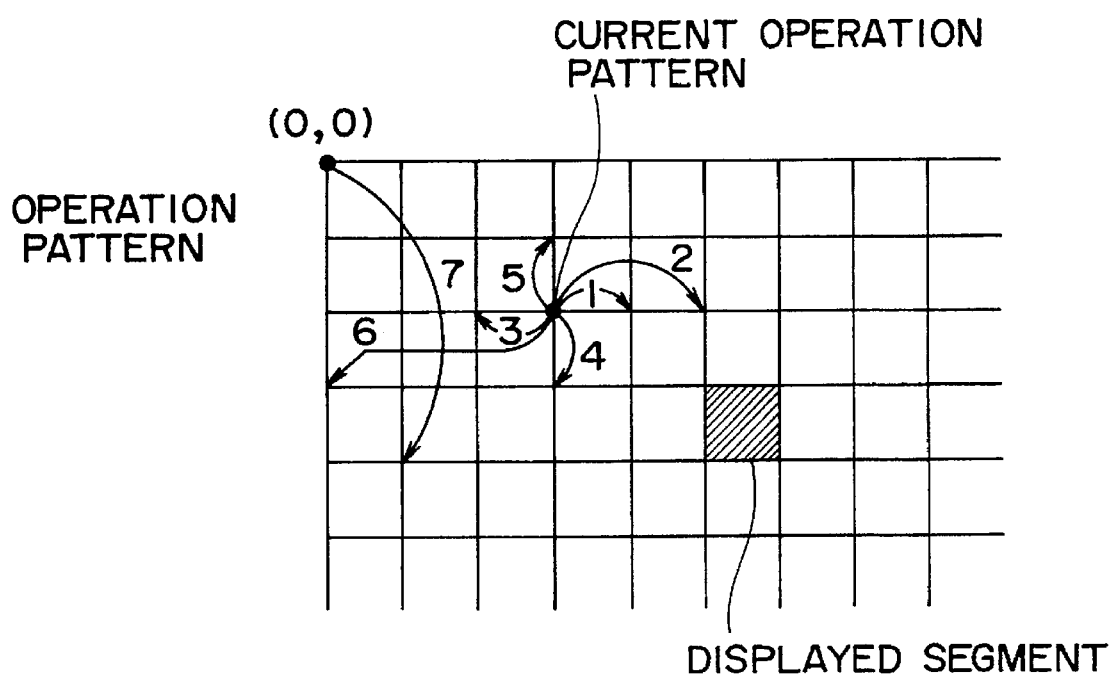

Byte PC3 of the topic/page header pack also includes an INIT flag which indicates whether the displayed picture is initialized or not. If INIT is "0", then the picture is initialized, and typically, when the first page is displayed, initialization is executed. RASTER COLOR of byte PC3 designates the raster color of the displayed characters. For example, when a teletext compatible code is adopted in the character coding scheme, raster-color designation control codes shown in FIG. 25B are employed, where control codes "0" to "F" (hexadecimal notation) are employed, and thus, it is possible to designate any one of nine colors ranging from black to white and to designate a high to low luminance with regard to seven colors from red to white.

FIG. 14B illustrates the data structure of a control text header pack. This pack contains topic data for the topic "menu", and includes auxiliary data indicating the total number of succeeding text packs (TDP), the type of data (TEXT TYPE), the character code utilized (TEXT CODE), the topic tag (TOPIC TAG), and the area at which the topic data is located (AREA No.).

In the control text header pack, TDP (byte PC1 and the four least significant bits of byte PC2) indicates (in binary notation) the total number of succeeding "text" packs included in the text unit, and the four highest bits of byte PC2 (TEXT TYPE) indicate the type of text in the text unit which is defined in accordance with the following codes:

0=NAME
1=MEMO (COMMENT)
2=STATION
D (Hex)=FONT (Decimal value 13)
E (Hex)=GRAPHIC (Decimal value 14)

Other values=Reserved

The text type "NAME" (0) indicates the program name, the text type "STATION" (2) indicates the broadcasting station name, and the text type "MEMO" (1) indicates other information. Further, the text types "FONT" (D) and "GRAPHIC" (E) are utilized when a teletext compatible code is designated by the TEXT CODE (described below), and are used for directly recording the dot pattern data transmitted by the teletext system.

The TEXT CODE (byte PC3) identifies the character coding scheme of the stored text data, and is defined as follows:

0=ASCII
1=Break point
2=Shift—JIS
3=Japanese EUC
4=Korean EUC
5=ISO 8859-1
6=TCA
80=Teletext compatible code (Decimal value 240)
81=UK-system teletext compatible code (Decimal 241)
Others=Reserved The area number (the four highest bits of byte PC4) of the control text header pack indicates the area at which the topic data is located (see FIG. 11A, described above), and designates the area by the following codes:

Area No. 0=AUDIO channel 1 (AAUX area)
1=AUDIO channel 2 (AAUX area)
2=AUDIO channel 3 (AAUX area)
3=AUDIO channel 4 (AAUX area)
4=VIDEO (VAUX area)
5=SUBCODE (Subcode data area)
6=Memory in cassette
7=No information Audio channels 3 and 4 (Area Nos. 2 and 3) are utilized with a high-definition television system, and the memory in cassette (Area No. 6) refers to memory locations within a memory (e.g. random access memory) located within the cassette housing of the magnetic tape.

FIG. 14C illustrates the control text pack utilized to store text data (i.e. menu data) for the topic "menu", and contains auxiliary data in bytes PC1 to PC4.

FIGS. 15A to 15D illustrate the data structure of a title start pack, a title end pack, a chapter start pack and a chapter end pack, respectively, and contain position data for the topic "TOC", previously described. Bytes PC1 to PC3 of these packs are utilized to store a 23-bit track number which identifies the track number at which a program having a specific title begins and ends, and the track number at which a chapter (or chapters) within that program begins and ends.

The TEXT bit in byte PC4 of the title start pack and the chapter start pack indicates whether text information (i.e. a name to be displayed in the table of contents) of the title of the program or chapter within that program exists. For example, when a chapter of a program does not have a name, the TEXT bit is "1" and the text header pack and the text pack of the chapter are not used, thus reducing the number of packs that need to be recorded or reproduced. The remaining bits of byte PC4 (GENRE CATEGORY) indicate the genre of the recorded program including, for example, genres such as "baseball", "movie", "travel", "drama", or the like.

The most significant bit in byte PC4 (flag PB) of the title end pack and the chapter end pack indicates whether the program to which the information in the title start, title end, chapter start and chapter end packs pertains, which is recorded at this location of the magnetic tape is currently in position to be played back. Flag PB is further described below.

FIGS. 16A to 16D illustrate the data structure of a title text header pack, a title text pack, a chapter text header pack, and a chapter text pack, respectively, and contain topic data concerning the name (i.e. title) of the recorded program or chapter within the program referred to above with reference to FIGS. 15A to 15D. The data structure of these packs is similar to the data structure of the control text header pack and control text pack shown in FIGS. 14B and 14C, except these packs refer to the topic "TOC", whereas the packs shown in FIGS. 14B and 14C refer to the topic "MENU".

FIGS. 17A and 17B illustrate the data structure of a VAUX text header pack and a VAUX text pack, respectively, and contain substantially the same information as contained within the control text header pack and the control text pack, respectively, shown in FIGS. 14B and 14C. A teletext pack, shown in FIG. 17C, is similar to the VAUX text pack and is used exclusively for storing teletext character data, and is described below in conjunction with another embodiment of the present invention.

A description of the PB flag located in the title end pack (FIG. 15B) and the chapter end pack (FIG. 15D) will now be described with reference to FIGS. 18A to 18D. FIG. 18A schematically illustrates a magnetic tape having chapters 1–10 recorded thereon, where ST1 to ST10 represent the track numbers of the beginning of chapters 1–10, respectively, and ET1 to ET10 represent the track numbers of the end of chapters 1–10, respectively. In this example, a track number indicates a location on a tape similar to a time code. The starting location and ending location of each chapter on the tape is indicated in FIG. 18B and this information is stored as topic data for the topic "TOC" in the sub-code area of each track on the tape, and therefore, can be reproduced from any position of the tape.

In accordance with the present invention, when a table of contents is generated (described below), the digital video tape recorder sets the PB flag of a table of contents entry if the chapter represented by that specific entry in the table of contents is located at the current position of the tape. That is, when a currently reproduced (or recorded) track contains digital video and audio data pertaining to chapter 1, the PB flag for the chapter 1 listing in the table of contents is set to "0", while the PB flag for all other chapter listings is set to "1", as shown in FIG. 18C. However, if the current tape position contains video and audio data of chapter 2, then the PB flag of the table of contents listing pertaining to chapter 2 is set to "0", while the PB flag of all other listings is set to "1", as shown in FIG. 18D. Therefore, the current chapter is easily determined by reproducing the table of content data (topic data for the topic "TOC") and identifying the chapter in the table of contents having its PB flag set to "1". In addition, the PB flag in the title end pack indicates the current title (i.e. program) being reproduced (or recorded).

Figure 19:
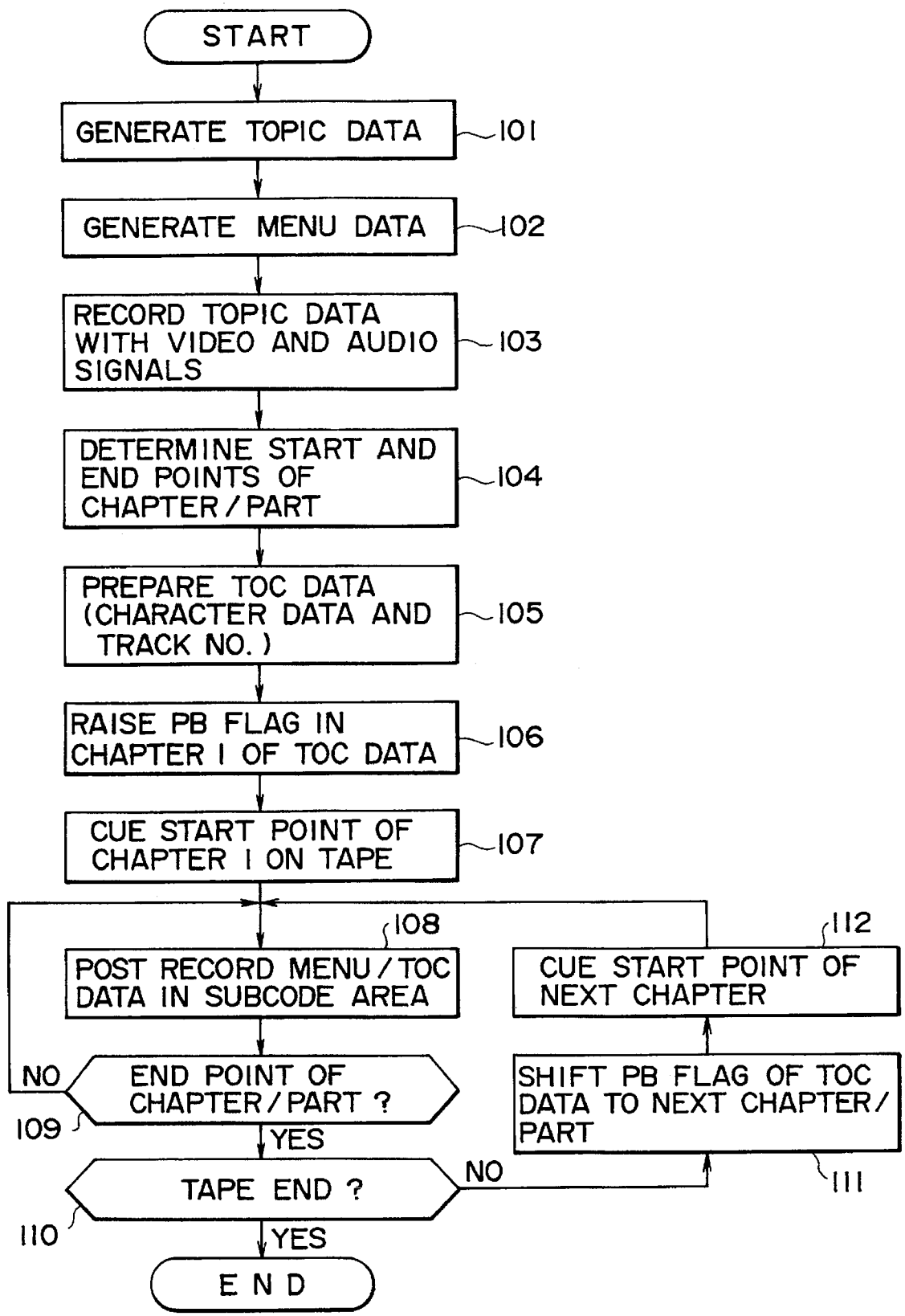
FIG. 19 is a flow-chart illustrating the generation of table of content data to be recorded on the record medium in accordance with the present invention.

FIG. 19 is a flow-chart illustrating the generation of table of content data in accordance with the present invention. As shown, topic data to be recorded in the VAUX or AAUX areas of a track and menu data to be recorded in the sub-code area of the track are generated by instructions 101 and 102, respectively. At instruction 103, topic data for all of the topics, except the topics "MENU" and "TOC", are recorded with the video and audio signals in the video and audio areas of each track in accordance with the above-described track structure. After all of the tracks of the entire tape are recorded, the tape is rewound to its beginning in order for the video tape recorder of the present invention to identify the beginning and ending of each chapter and each part within each chapter. At instruction 104, the starting position and ending position of each chapter and the starting and ending positions of each "part" within each chapter are determined by reproducing each track of the tape, and the table of contents (i.e., the topic data for the topic "TOC") for the entire tape is generated at instruction 105. The PB flag of chapter 1 in the table of contents is set to "0" at instruction 106, to indicate that the tape is currently positioned at chapter 1 (after rewinding the tape by instruction 107). Then, before the menu data and table of content data are recorded in the sub-code area of each track in chapter 1, the starting point of chapter 1 is located (e.g., by rewinding the tape) at instruction 107. At instruction 108, the menu data and the table of content data are stored in the sub-code area in this post-recording mode. Program flow continues to inquiry 109, whereat it is determined whether the tape is at the end of the chapter or part. If not, then post-recording continues at instruction 108. However, when the tape reaches the end of the chapter or part, inquiry is made at 110 to determine if the end of the tape has been reached. If it is determined that the tape is at its ending position, then the process of FIG. 19 terminates. However, if the end of the tape has not been reached, instruction 111 is initiated whereat the PB flag of the next chapter (or next part in the case when the end of a part is reached but the end of the chapter has not been reached) in the table of contents to be recorded in the next chapter (or part) is set to 0, and the previous chapter's (or previous part's) PB flag is set to 1 in the table of contents to be recorded in the next chapter (or part). The starting position of the next chapter (or part) is then located at instruction 112 before post-recording of the menu and table of contents continues at instruction 108. This procedure thus provides for the recording of both menu data and table of content data in the sub-code area of every track on the magnetic tape.

Figure 20:
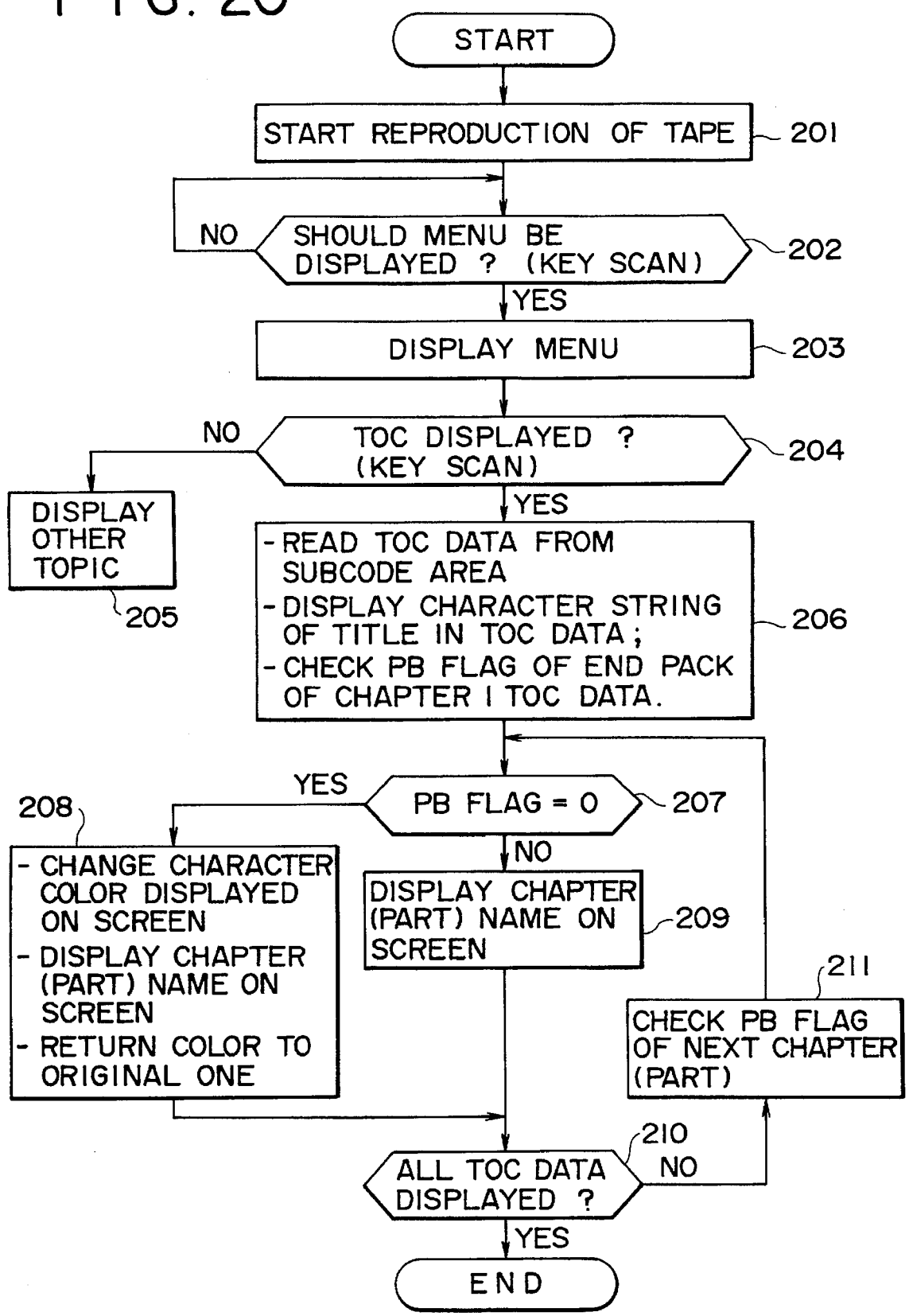
FIG. 20 is a flow-chart illustrating the reproduction of the table of content data from the record medium in accordance with the present invention.
Figures 22A, 22B:
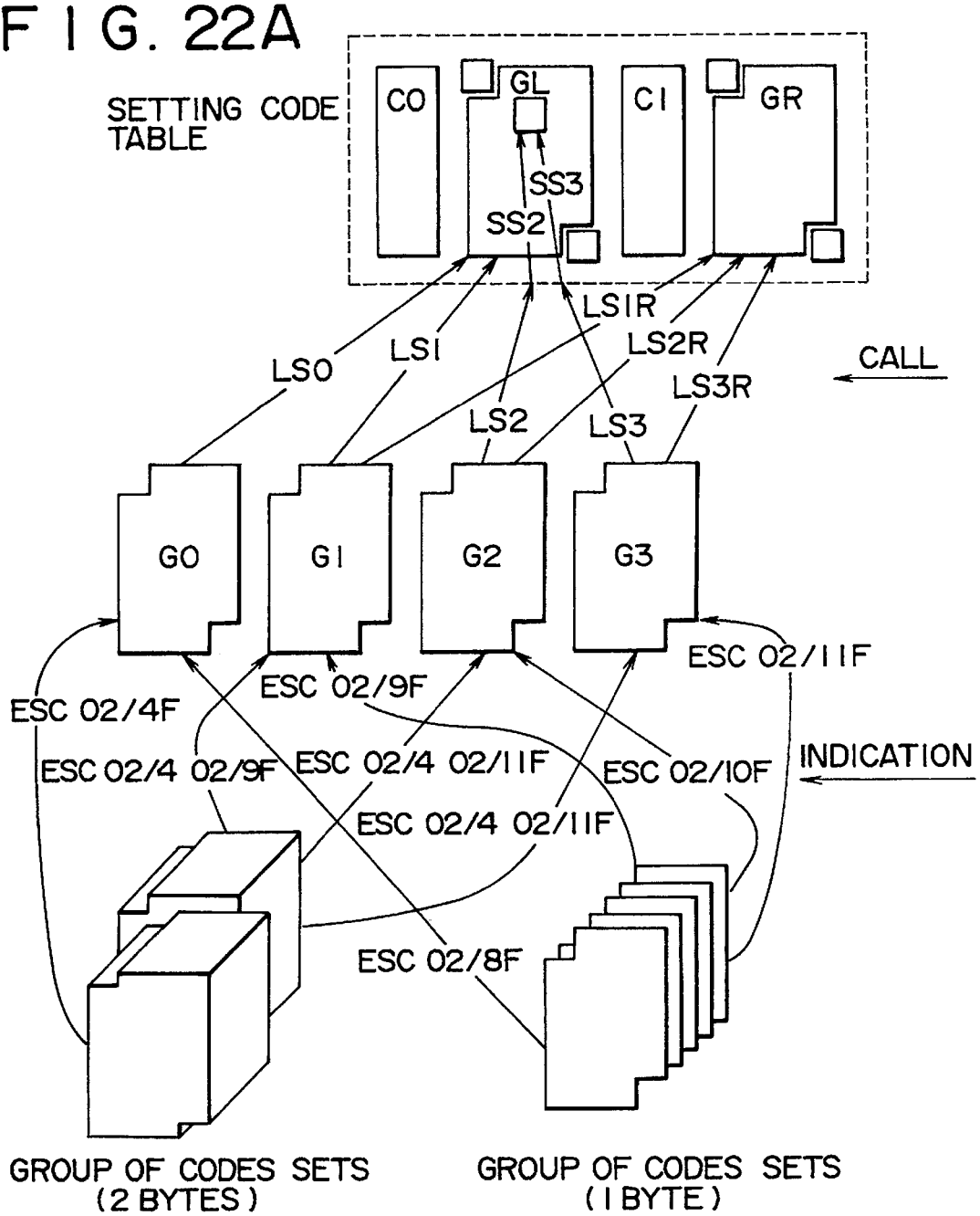
FIG. 22A is a diagram and FIG. 22B is a call code showing an extension method of 8-unit code in the teletext compatible coding scheme.

FIG. 20 is a flow-chart illustrating the reproduction of the table of contents in accordance with the present invention. As shown, the magnetic tape reproduces data at instruction 201. If inquiry 202 determines that the menu should be displayed (e.g., by depressing a "menu" button on a remote control device), then the menu is displayed at instruction 203. However, processing returns to instruction 201 if it is determined that the menu should not be displayed.

After the menu is displayed, inquiry 204 determines if the table of contents should be displayed. If not, instruction 205 is initiated which displays another topic. However, if the table of contents is to be displayed, then, at instruction 206, the table of contents is reproduced from the sub-code area of the track and the title is displayed. In addition, the PB flag of the chapter 1 table of contents entry is detected. If it is determined that the PB flag is "0" at inquiry 207, then program flow continues to instruction 208, whereat the current chapter/part is displayed (i.e. listed) in a different color (or font, etc) on the monitor, and then the color (to be used) is set to a standard color. If the PB flag is "1", then instruction 209 causes the chapter/part to be displayed (i.e. listed) in the standard color. After the chapter is displayed, it is determined at inquiry 210 if the entire table of contents is being displayed (i.e., all of the table of content data has been reproduced and processed). If not, then the PB flag of the next chapter is reproduced at instruction 211 before returning to instruction 207.

In the above-described process of displaying a table of contents, only the chapter at the current tape position (i.e., at the position for playback) is displayed in a different color to indicate the current chapter. However, the current chapter may be distinguished from the other chapters by any distinguishing feature, such as a distinctive mark next to the chapter name. In addition, the above-described process may also display other titles (i.e. programs) stored on the magnetic tape and their corresponding chapters.

FIG. 21 illustrates thirteen packs of topic data for the topic "MENU" which comprise a single page unit for displaying the fifteen characters "TOC STAFF KARAOKE". The first of the thirteen packs is a topic/page (TP) header pack, defined by item code 07 (hexadecimal) in byte PC0, which indicates that the topic tag and language tag are both "0" since byte PC1 equals "00" (see FIG. 14A). Therefore, "MENU" is the designated topic and the main language is designated to be used for the menu display. In addition, bytes PC2 to PC4 indicate a "super fixed display", meaning that the contents of the menu is to be superimposed on the display without any scrolling.

The second pack of the menu data is a control text header pack, which has an item code 08 (PC0), and bytes PC1 and PC2 indicate that five control text packs follow the control text header pack. In addition, the four most significant bits of byte PC2 and byte PC3 indicate that the information recorded in the subsequent text packs is a name (i.e. topic name) and that the character information is based on the teletext compatible code.

When recording character information using a character coding scheme, as will now be described, it is generally preferred to employ the character broadcasting code adopted in the individual country or district where the digital video tape recorder is to be used. In Japan, for example, a teletext compatible code is employed, and if the digital video tape recorder is capable of decoding character data based on the teletext compatible code, it is possible to enhance the representation of the character information. In addition, it would be advantageous to be able to record, reproduce and display character information using one standard, and to receive and display a character broadcast using that same standard, thus simplifying both hardware and software of the digital video tape recorder.

FIGS. 22 to 26 illustrate the character code sets and various control codes in the teletext compatible coding scheme. Briefly explaining these figures, FIG. 22A shows an 8-unit code extension method in the teletext compatible coding scheme, and call and indication codes are shown in FIG. 22B, which are executed by a call and indication code, respectively, shown in 23A and 23B. A terminal code for designating a character code set to be called is illustrated in FIG. 24A, and FIGS. 24B and 24C show a color control code and a character size control code, respectively. FIG. 25A shows an operation pattern with respect to the control of the operating position, FIG. 25B is an operating-position control code, and FIG. 26 shows a time control code. All codes within parentheses ( ) in FIGS. 23 to 26 are expressed in hexadecimal notation.

Referring back to FIG. 21, byte PC4 of the first control text header pack indicates that the data in the five subsequent control packs have a topic tag of "1" (i.e., indicating that these packs supply table of content information to be used in the menu display) and are recorded in the sub-code area of the track.

In the first four of the five control text packs following the first control text header pack, commands are recorded for executing an indication and a call of the character code set designated by the text header pack and are used on the basis of the teletext compatible coding scheme. The fifth control text pack contains the character information "TOC".

The next control text header pack indicates that two control text packs are included in this text unit, that a topic tag of 2 is assigned, that the character data in the two control text packs is a program name, and that the topic data assigned the topic tag 2 is recorded in the VAUX area of the track. As shown, the character information "STAFF" is stored in the two subsequent control text packs.

The next-following pack is a control text header pack which indicates a topic tag of 3, that two control text packs are included in this text unit, that a program name is stored, and that the data for this topic is recorded in the AAUX area of the track. The two subsequent control text packs store the name "KARAOKE".

FIG. 27 is an example of topic data for the topic "TOC". As shown, the first pack is a topic/page (TP) header pack that indicates that the page unit number is 0 (seven least significant bits of byte PC4 as indicated in FIG. 14A), which indicates that this page unit contains the position data for the topic "TOC". As previously discussed with reference to FIG. 12A, topics other than topic "TOC" do not include position data, and therefore, begin with page unit 1.

Position data, which refers to the tape position at which title, chapters and parts begin and end, is located in page unit 0 in order to provide a fast determination of a desired tape location and subsequent positioning of the tape to that location. The position data is stored in the title start, title end, chapter start and chapter end packs, previously described, and is also stored in "part start" and "part end" packs, which have a data structure similar to the chapter start and chapter end packs, respectively. Each of these packs indicates a track number on the tape at which the title, chapter or part begins or ends. The position data is illustrated in the second through seventh packs in FIG. 27.

After the position data (page unit 0), character data indicative of title and chapter names is stored in page unit 1 as shown in the eighth through fourteenth packs. The title/page (TP) header (eighth pack in FIG. 27) indicates that the page unit number is 1. A subsequent title text header pack indicates that a title name is stored in the following two title text packs, wherein the two title text packs store the title name "SOME DAY". The chapter text header pack (the twelfth pack) designates that the name of chapter 2 is stored in the following two chapter text packs. This data does not refer to chapter 1 since chapter 1 has been designated to not have a name (discussed below). The two chapter text packs store the character information "So young" as the chapter 2 name. Similarly, a part text header and part text packs may be stored to indicate the name of a part.

During reproduction, the title, chapter and part names stored in the TOC data are displayed sequentially in the order they are stored. As previously discussed, the title, chapter or part at which the tape is currently located is identified in the table of contents by the PB flag in the title end, chapter end and part end packs, respectively, of the TOC data. If a user selects a desired title, chapter or part to be located, then the position data which corresponds to the selected title, chapter or part is retrieved from page unit 0 stored on the track. The tape is then advanced or rewound to that position.

Referring again to FIG. 27, the first topic/page (TP) header contains a topic tag of 1, indicating the "TOC" topic, and a language tag of 0, indicating that character data which follows is in the main language. The following position data located in the second to seventh packs, previously discussed, identifies the starting and ending locations of the "title" (i.e. program) and chapters 1 and 2 of that program. The PB flag of the title end pack and the first chapter end pack (chapter 1) is "0", indicating that the tape is currently at a position within chapter 1 of this title. In addition, the text flag (most significant bit of byte PC4) of the first chapter start pack indicates that a chapter name has not been assigned to chapter 1.

Figure 28:
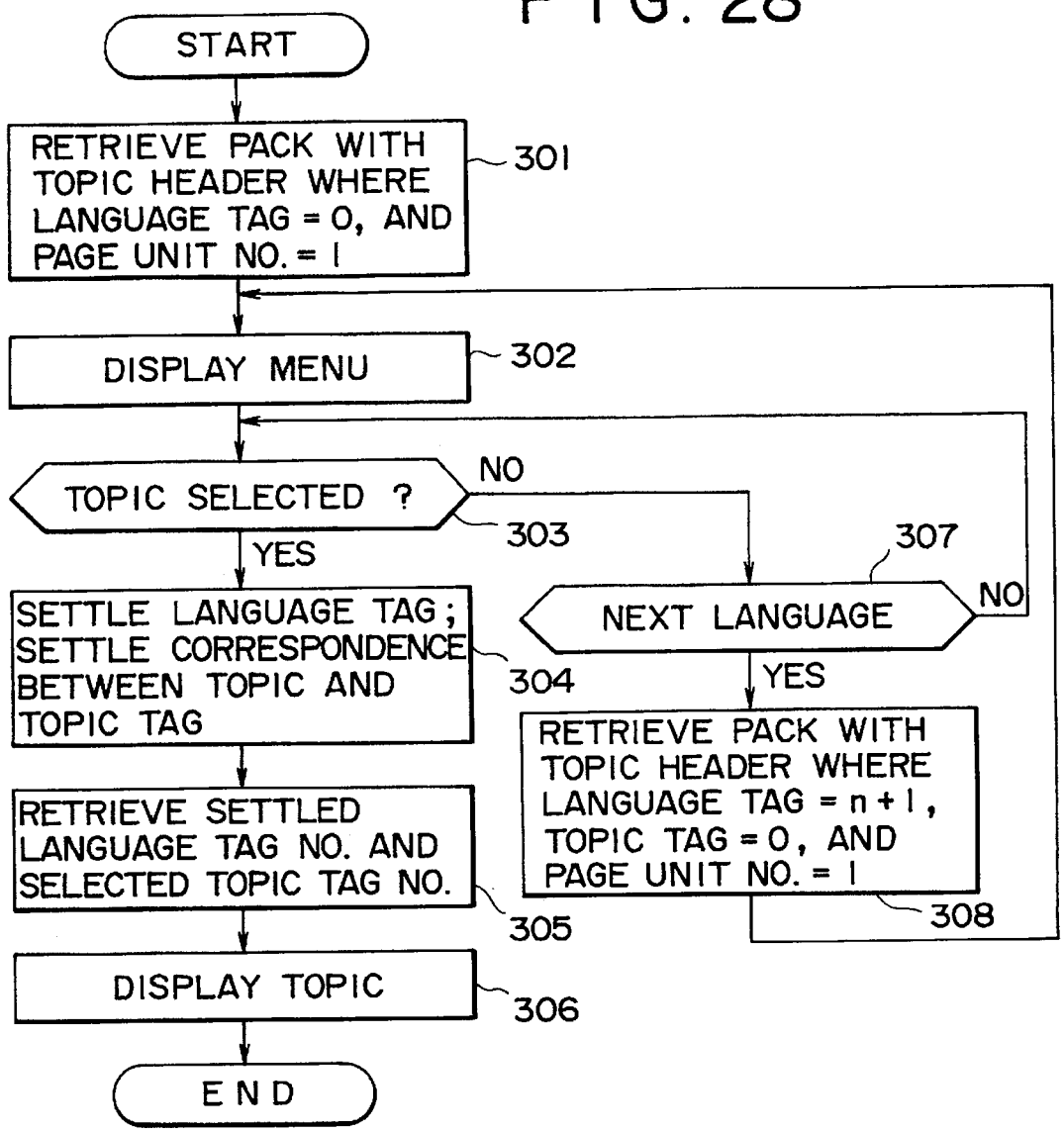
FIG. 28 is a flow-chart illustrating the process of selecting and displaying a topic with a specific language tag.

The process of selecting a topic and displaying the selected topic in a desired language will now be described with reference to the flow chart of FIG. 28. Once a user initiates the display of the menu (e.g. by depressing a "menu" button on a remote controller device), topic headers having a topic tag of 0 (indicating the menu data), a language tag of 0 (indicating the main language), and a page unit number of 1 are reproduced from the SUBCODE area of the current track, as indicated by instruction 301. From this information, a menu is generated and displayed at instruction 302, which includes the existing topic names and indicates whether a topic may be displayed in another language (i.e., whether a language tag other than "0" exists for a specific topic). At inquiry 303, it is determined whether the user has selected a topic to be displayed. If the user has not selected a topic, then inquiry 307 determines whether the user has chosen a topic to be displayed in a different language. If not, the process returns to instruction 303, but if a different language has been selected for a specific topic, then the topic header having the next higher language tag for the selected topic is retrieved at instruction 308, before returning to instruction 302.

If the user has selected a topic to be displayed, as determined by inquiry 303, then at instruction 304, the topic tag and language tag for the selected topic are ascertained and the area at which the selected topic is stored (i.e. AAUX, VAUX or Subcode) is detected from the area number of the selected topic (previously discussed). At instruction 305, the topic/page (TP) header and its corresponding text packs having the ascertained topic tag and language tag are retrieved from the area of the track at which the selected topic is stored. At instruction 306, the topic data of the selected topic is displayed to a user in accordance with the color and scrolling designations stored in byte PC3 of the topic/page (TP) header pack (see FIG. 14A).

When a second page of data (page unit 2) is stored after page unit 1, this data of page unit 2 is displayed in the same manner as the data of page unit 1. As discussed above, the total number of page units of topic data for a specific topic is stored in the topic/page (TP) header.

In the present invention, character information may also be recorded in a "simple mode", which is primarily used by consumers. The simple mode will now be described.

The simple mode is utilized when a viewer supplies character data to the digital video tape recorder of the present invention in order to store a television program name or station name on the magnetic tape, and also when a program list is transmitted by the teletext system. In the simple mode, topics and pages (i.e. page units) are not utilized. However, the pack structure and data structure of the stored character information is the same as the full mode except that topic/page (TP) header packs are not utilized.

When a user supplies character data to indicate a program name (e.g. by depressing keys on a remote control device or on a key pad on the digital video tape recorder), the user first designates which area of the track upon which the supplied information is to be recorded (i.e. AAUX, VAUX) and supplies the character data (i.e. program name) prior to recording the television program because the video and audio areas of a track may not be able to be post-recorded upon i.e. recorded upon after video and audio data have been recorded) without affecting the data already stored thereon.

Figure 12C:
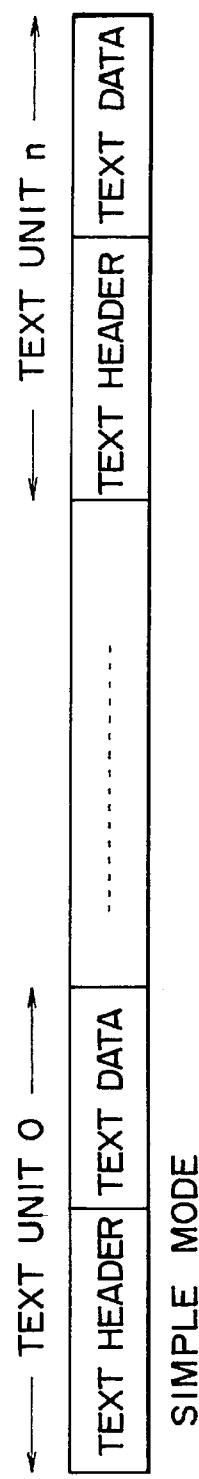

FIG. 12C illustrates the data structure of stored character information in the simple mode. Text units similar to text units of the full mode are utilized to store character data related to a recorded program. Each text unit includes a text header and text data as shown in FIG. 29, which illustrates an example of pack data recorded in the VAUX area and which contains a television program name and a station name. As shown, each VAUX text header pack is followed by a sequence of VAUX text packs containing the character information.

The digital video tape recorder operable in the simple mode in accordance with the present invention can also utilize the program name and station information supplied by the teletext system to be recorded with the video and audio information. Different teletext systems broadcast character information in different ways; for example, Japan, North America, the United Kingdom and France each have different teletext systems.

Figure 30:
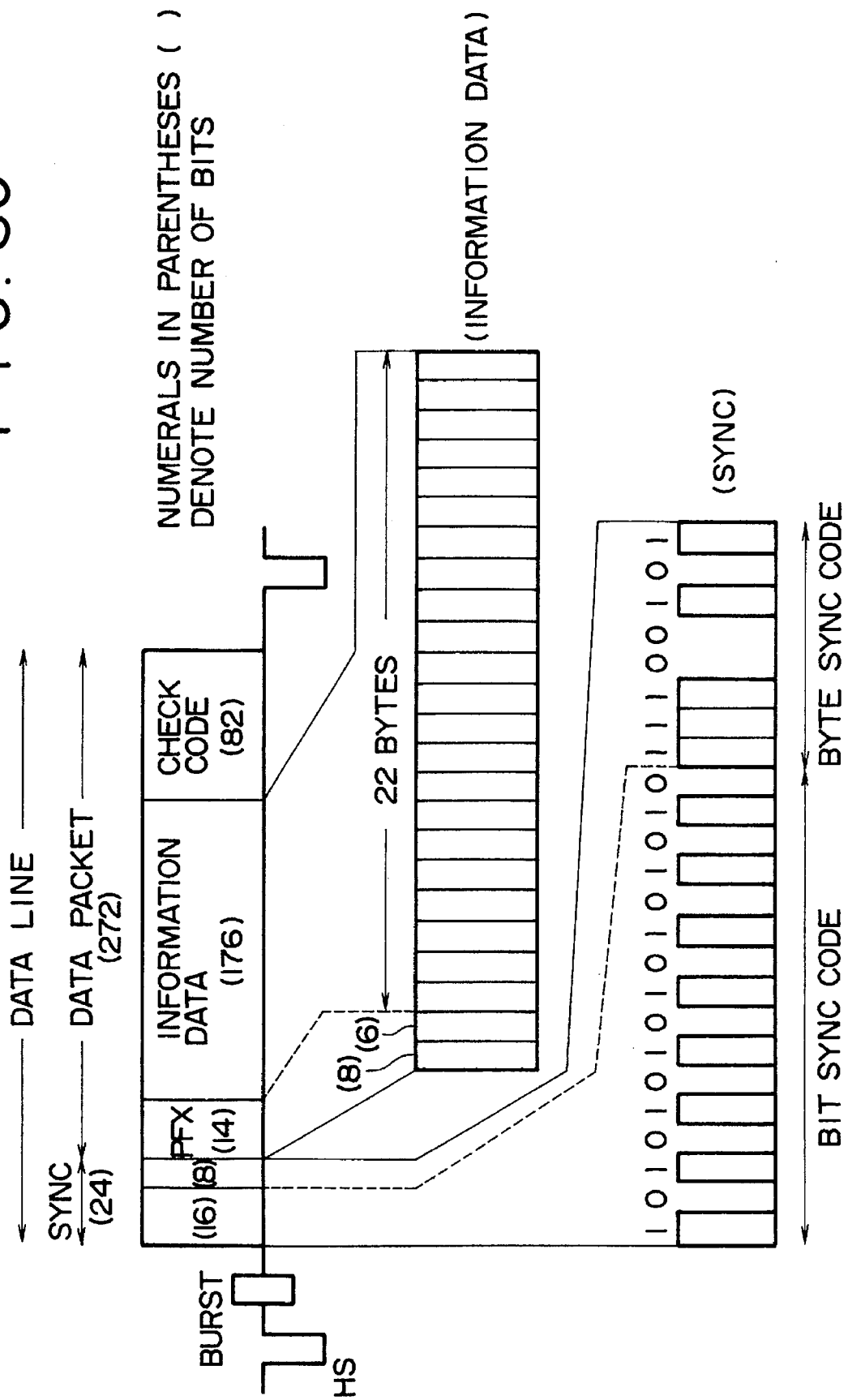
FIG. 30 illustrates the data structure of one line in the teletext system.

FIG. 30 shows an example of a format of one line of the teletext signal in the character multiplex broadcasting system that has been adopted in Japan. In this system, various lines of the television signal (line Nos. 14, 15, 16, 21, 277, 278, 279, 284) are used for multiplexing the character information, and a maximum of 16 lines may be used according to this standard. In one line of character data, bit sync codes are composed of repetitive pulses of "1"'s and "0"'s (this bit sync code is typical for other teletext systems) and data other than this bit sync code is recorded by the digital video tape recorder.

The following bytes per line are available for the following teletext systems:
  Japan 280 bits (35 bytes)
  North America 272 bits (34 bytes)
  United Kingdom 344 bits (43 bytes)
  France 304 bits (38 bytes)

Figure 31:
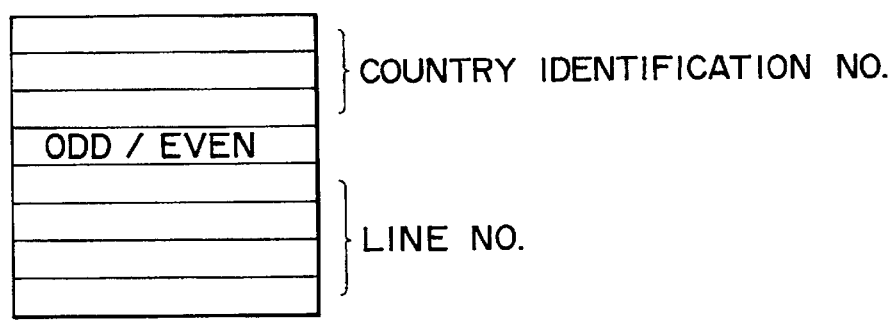
FIG. 31 illustrates the data structure of the line ID.

Consistent with the foregoing teletext system, a sync byte of 8 bits, as shown in FIG. 31, is detected from the broadcast signal and identifies the type of teletext system and the lines containing the character data (teletext data). The broadcast data can then be decoded. As shown, the 8 bits comprise a "line ID", the four least significant bits identifying the line number within the broadcast field at which this line ID is located, the next higher bit (ODD/EVEN) identifies whether an odd field or an even field is being broadcast, and the three most significant bits comprise the country identification number, identifying the type of the teletext system.

Figure 32:
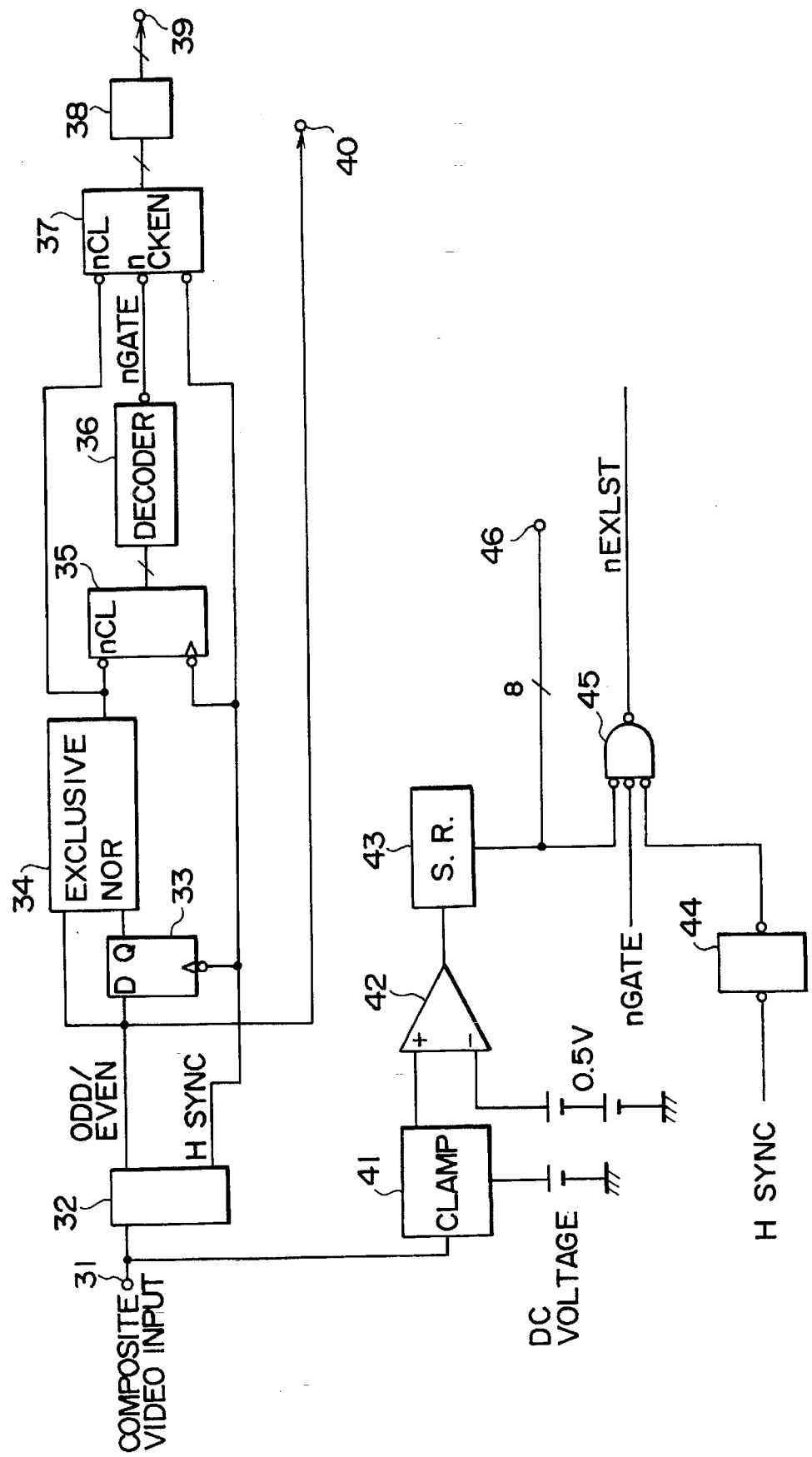
FIG. 32 is a circuit diagram for generating line numbers in the teletext system.
Figure 33A:
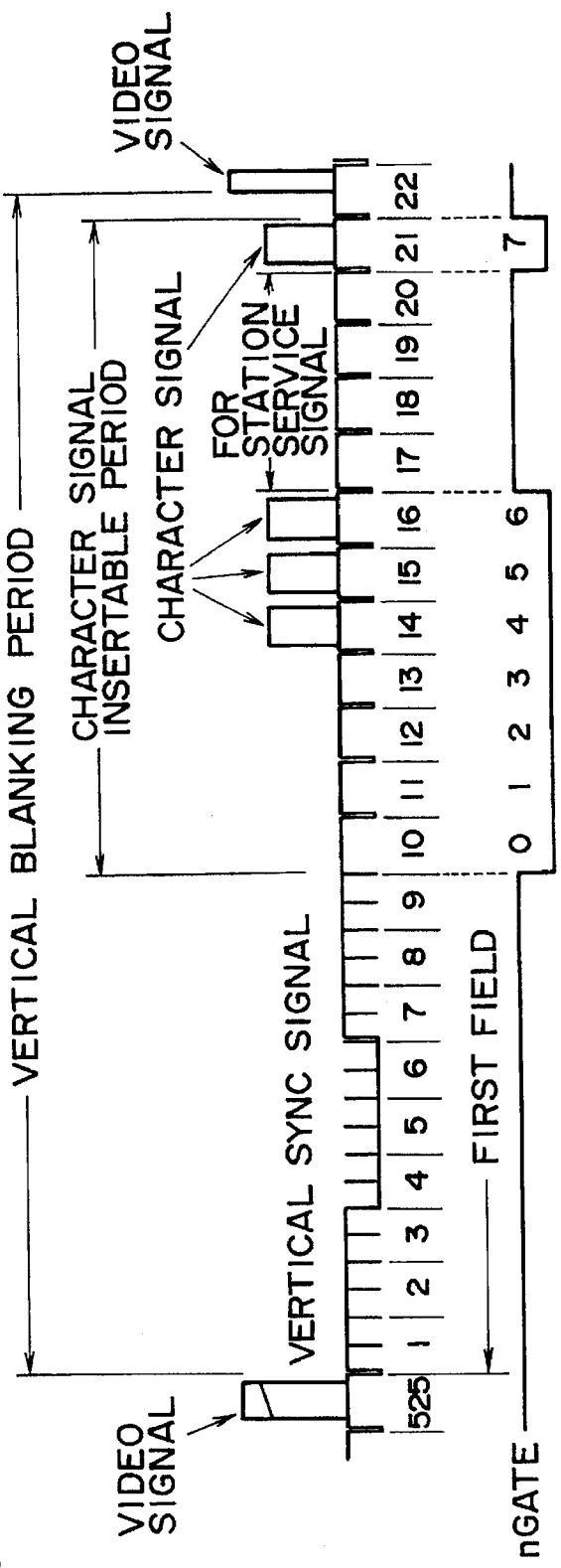
FIGS. 33A and 33B illustrate characteristics of the signal nGATE.
Figure 33B:
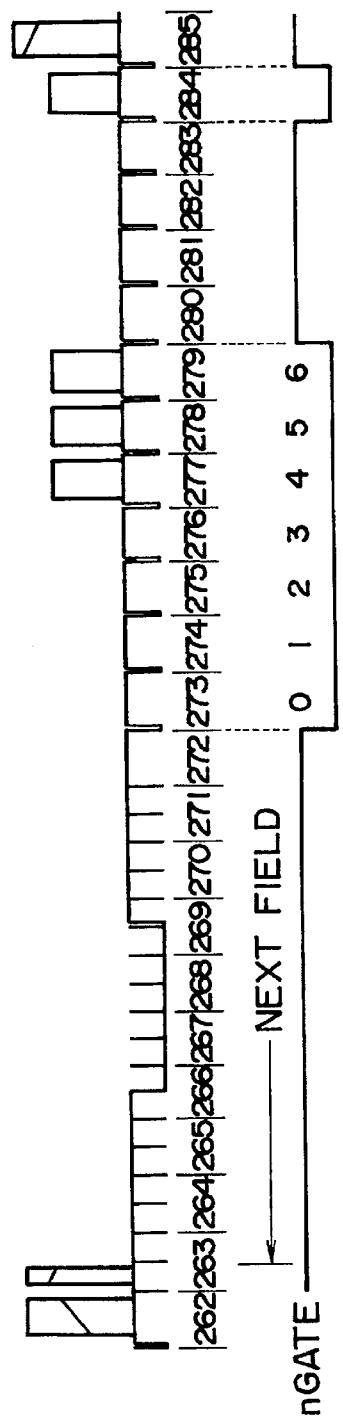

FIG. 32 illustrates an example of a circuit diagram for generating a line number containing the teletext data from the line ID. A composite video signal is supplied to a horizontal sync detector circuit (IC 32) from terminal 31. IC 32, which is known in the art, produces from the composite video signal a horizontal sync (HSYNC) signal and ODD/EVEN field discrimination signal. A D-type flip flop 33 and an exclusive NOR circuit 34 together detect the rise and fall times of the ODD/EVEN discrimination signal and generate a pulse of a duration equal to the period L of the HSYNC signal. A counter 35 is enabled by the ODD/EVEN discrimination signal to count the trailing edge of the HSYNC signal, and supplies the counted value (i.e., the number of horizontal syncs during the period of a single pulse supplied to input nCL of counter 35) to a decoder 36 that produces an nGATE signal whose characteristics are shown in FIGS. 33A and 33B. The trailing edge of the HSYNC signal is counted by a second counter 37 which is enabled by the nGATE signal, and a decoder 38 decodes the counted number, generating the line numbers from 0 to 7. These line numbers are the 4 least significant bits of the line ID shown in FIG. 31, and the ODD/EVEN discrimination signal is used as the next highest bit. Further, as described above, the country identification code is provided as the three highest-order bits of the line ID, and these may be replaced by three fixed bits stored in a television tuner, which may be different depending on the location where the digital video tape recorder is to be used. Alternatively, these fixed bits may be generated by a mode control microcomputer in the digital video tape recorder which generates the three bits depending on the geographic location of the digital video tape recorder.

Referring again to FIG. 32, circuit elements 41-45 comprise a circuit which generates an inhibit signal to prevent recording of data in the packs when no character data is provided in the teletext signal. As shown, the composite video signal supplied at terminal 31 is clamped to a reference level by a clamper 41 prior to being compared with a reference voltage by a comparator 42. The comparator supplies to a shift register 43 the discriminated signal. A monostable multivibrator 44 activates a gate circuit 45 after the lapse of a predetermined time from the fall of the HSYNC signal supplied to it. Gate circuit 45 receives the nGATE signal from decoder 36, the output of shift register 43 and the output of monostable multivibrator 44. When all of the received values are "0", gate circuit 45 supplies an output which represents that the video level is a pedestal level and that no character data exists.

When character data is supplied with the video and audio signal, data of one line is recorded in the following order: line ID, PFX, information data and check code. Before recording the character data on a track, one frame of teletext character data is stored in a FIFO memory or the like, and then read from the memory and recorded in empty regions of the optional areas of the AAUX or VAUX areas in teletext packs shown in FIG. 17C, in synchronism with the recording of the digital video and audio information. The teletext pack is used exclusively for storing teletext character data. In addition, no header packs are utilized when teletext character data is stored.

One video line interval contains 35 bytes of teletext data, which require nine teletext packs since each pack stores four bytes of data. Therefore, 72 teletext packs are required to store the teletext data in one frame having eight lines of such teletext data. As previously discussed, the same auxiliary data is stored in alternating positions of successive tracks, thereby ensuring a high degree of reproducibility of the stored teletext character data.

Figure 1:
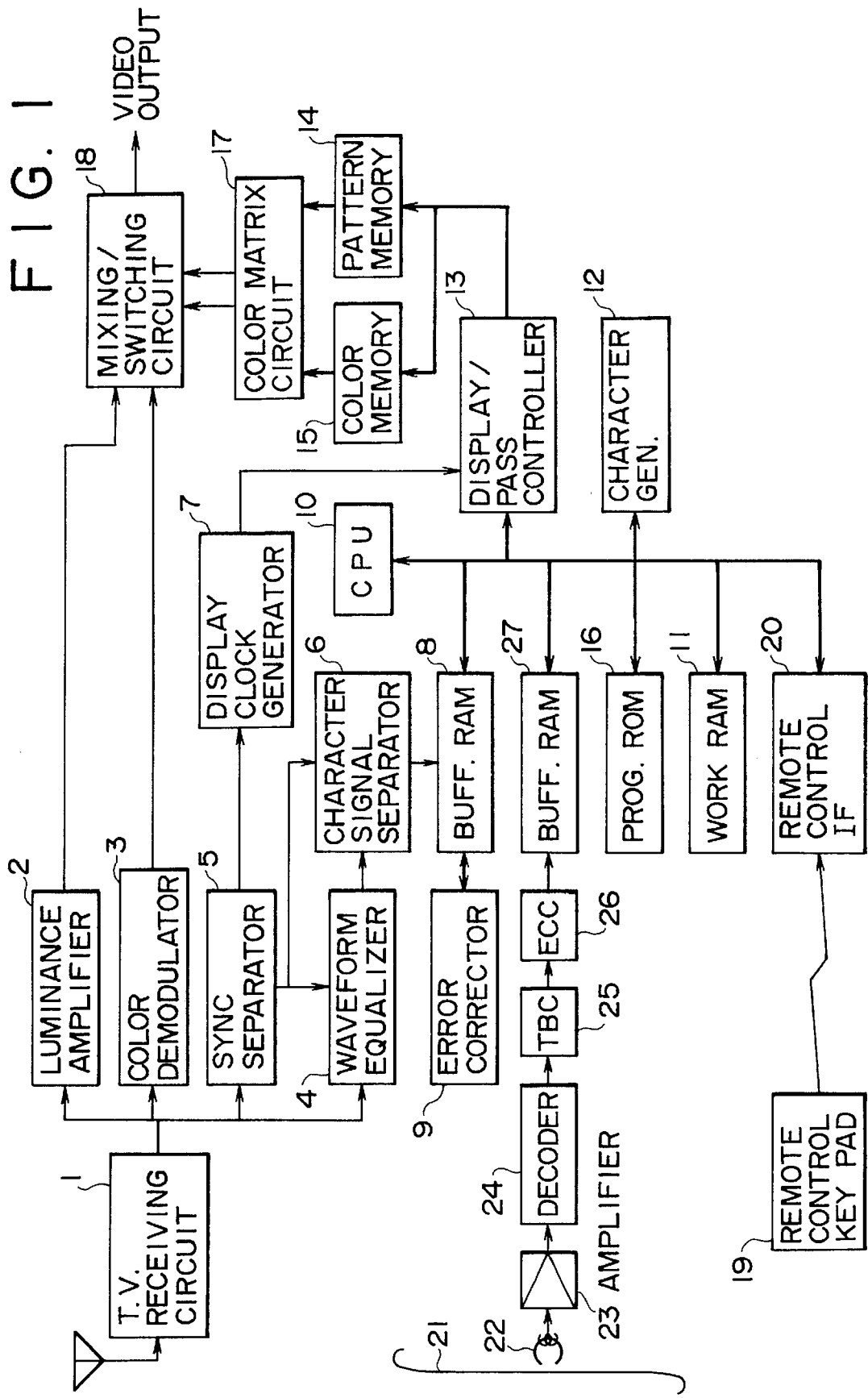
FIG. 1 is a block diagram of apparatus in accordance with the present invention for recording and reproducing digital video and audio data.

FIG. 1 illustrates a block diagram of the digital video tape recorder of the present invention which records teletext character data with the video signal. As shown, a broadcast video signal supplied to a television receiving circuit 1 is demodulated and supplied to a luminance amplifier 2, a color demodulator 3, a waveform equalizer 4 and a sync separator 5. The sync separator extracts the sync signal from the video signal and supplies the sync signal to the waveform equalizer which decodes the teletext signal contained in the video signal. The sync signal is also supplied to a character signal separator 6 and a display clock generator 7.

Waveform equalizer 4 reduces the distortion produced during the transmission of the video signal and then supplies the video signal to character signal separator 6 which separates the character signal superimposed in the vertical blanking period from the video signal in accordance with the sync signal. The character signal is stored in a buffer RAM 8, and is error corrected by an error corrector 9. A CPU 10 groups the character data in the buffer RAM which constitutes one teletext program before storing the data in a work RAM 11. The CPU sequentially decodes the data and supplies same to a character generator 12 which generates a dot pattern for each amount of data representing one character. The dot patterns are stored in a pattern memory 14. If the decoded data is a color-designating control code, then the data is stored in a color memory 15 in accordance with the control code. A display/pass controller 13 controls the timing of the write operations and a program ROM 16 contains the software routines which are executed by CPU 10.

A color matrix circuit 17 produces a luminance signal and a color difference signal in accordance with the dot pattern stored in pattern memory 14 and the color data stored in color memory 15. A mixing/switching circuit 18 mixes the luminance and color difference signals supplied from circuit 17 with the luminance and color difference signals supplied by luminance amplifier 2 and color demodulator 3, respectively. The mixed signals are then supplied as a video output either to be displayed on a digital video monitor or digitally recorded onto a magnetic tape.

It will be appreciated that RGB signals (red, green and blue signals) may be mixed with the teletext signal instead of the luminance and color difference signals.

In addition, if the teletext character data represents a television program list, a user can program (via a remote control interface 20 having a keypad 19) the digital video tape recorder of the present invention to record a future program while viewing the program list on the video monitor.

When character data is stored on the magnetic tape, it is reproduced and processed in the following manner: a magnetic head 22 reproduces a track of digital data from a magnetic tape 21 and supplies the reproduced data to a decoder 24 through a reproduction amplifier 23. The data is converted into digital form, jitter caused during reproduction is eliminated by a time base corrector (TBC) 25, and errors are corrected by an error correcting circuit (ECC) 26. The error-corrected character data is stored in a buffer RAM 27 before being decoded by CPU 10. When the character data recorded on the tape is based on the same character coding scheme as that employed in the teletext system, CPU 10 decodes the character data by using the teletext decoding routine (discussed above), thereby reducing the amount of software required in the digital video tape recorder and obviating the need for another CPU or character generator circuit.

While the present invention has been particularly shown and described in conjunction with preferred embodiments thereof, it will be readily appreciated by those of ordinary skill in the art that various changes may be made without departing from the spirit and scope of the invention. For example, although a specific data structure has been fully described for recording (and reproducing) video, audio and auxiliary data, the present invention is not limited to this structure and may record data in other data structures.

As another example, although the foregoing has only described the storing of the topics "MENU" and "TOC" in the sub-code area of each track, the present invention may record and reproduce other topics in the sub-code area which may be generic to prerecorded "soft" tapes.

Still further, although the present discussion is directed to recording and reproducing video and audio signals, the present invention is not limited solely to these types of signals and may be widely applied to the recording and reproducing of only audio signals or other types of signals.

Therefore, it is intended that the appended claims be interpreted as including the embodiments described herein, the alternatives mentioned above, and all equivalents thereto.

What is claimed is:

1. Apparatus for recording digital video and digital audio data on a record medium, comprising:
    means for receiving digital video and digital audio data and topic data having identifying topics to be recorded, each of said topic data corresponding to the received digital video and digital audio data;
    means for generating menu data in accordance with said identifying topics, said menu data representing a menu of said identifying topics;
    means for arranging said digital video and digital audio data, said topic data and said menu data in a predetermined format for recording, said format including video, audio and sub-code areas in which video data, audio data and menu data, respectively, are provided, said video and audio areas having respective auxiliary areas in which topic data is provided; and
    means for recording successive tracks on said record medium, each track containing said digital video data, said digital audio data, said topic data and said menu data in said predetermined format.

2. The apparatus of claim 1, wherein said topic data is associated with one of said digital video data and said digital audio data, and said means for arranging provides topic data associated with said digital video data in said auxiliary area of said video area, and provides topic data associated with said digital audio data in said auxiliary area of said audio area.

3. The apparatus of claim 2, wherein said menu data includes position data indicative of the respective area of a track in which said topic data is located, and said means for recording records said position data in said sub-code area of each of said successive tracks.

4. The apparatus of claim 1, further comprising means for generating table-of-content data identifying the content of the data recorded in said video and audio areas of each track, and wherein said means for recording records said table-of-content data in said sub-code area of each of said successive tracks.

5. The apparatus of claim 4, wherein said means for recording is operable to after record said table-of-content data on tracks already having video and audio data recorded thereon.

6. The apparatus of claim 4, wherein said table-of-content data includes an identifying topic table-of-contents, and said menu data includes said identifying topic table-of-contents.

7. The apparatus of claim 4, wherein said table-of-content data identifies chapters of a program recorded on tracks on said record medium.

8. The apparatus of claim 7, wherein said table-of-content data identifies the chapter recorded in the respective track in which said table-of-content data is recorded.

9. The apparatus of claim 7, wherein said table-of-content data identifies parts of each of said chapters and also identifies the part recorded in the respective track in which said table-of-content data is recorded.

10. The apparatus of claim 7, wherein said means for generating table-of-content data includes means for determining a beginning and an ending of each of said chapters, and wherein said table of content data includes data corresponding to said beginning and said ending of each of said chapters.

11. The apparatus of claim 10, wherein said table-of-content data recorded on a respective track identifies the chapter in which said respective track is located.

12. The apparatus of claim 1, wherein said topic data corresponding to at least one of said identifying topics includes character data representing a plurality of languages.

13. The apparatus of claim 1, further comprising
    means for reproducing said menu data from said sub-code area of a track; and
    means for generating a menu list of said identifying topics from said menu data.

14. The apparatus of claim 13, further comprising means for selecting one of said identifying topics from said menu list and means for providing said topic data corresponding to said selected identifying topic as an output.

15. The apparatus of claim 14, wherein said means for providing includes means for reproducing only said respective area of said track in which said topic data corresponding to said selected identifying topic is located.

16. The apparatus of claim 14, wherein said topic data corresponding to at least one of said identifying topics includes character data representing a plurality of languages, said means for selecting includes means for selecting a language of said selected identifying topic, and topic data corresponding to said selected identifying topic and said selected language is provided as an output.

17. Apparatus for recording and reproducing digital video and digital audio data on a record medium, comprising:
    means for receiving digital video data, digital audio data, topic data corresponding to the received digital video and digital audio data and having identifying topics, and character information from a teletext broadcast system;
    means for generating auxiliary character data from said character information in accordance with said teletext broadcast system;
    means for arranging said digital video and digital audio data and said auxiliary character data in a predetermined format for recording, said format including video and audio areas in which video data and audio data, respectively, are provided, said video and audio areas having respective auxiliary areas in which auxiliary character data and topic data are provided; and
    means for recording successive tracks on said record medium, each track containing said digital video data, said digital audio data, said topic data and said auxiliary character data in said predetermined format.

18. The apparatus of claim 17, wherein said auxiliary character data includes a list of broadcast programs identifying said digital video and digital audio data that can be received.

19. The apparatus of claim 17, wherein said character information includes a control code, and said auxiliary character data is generated in accordance with said control code.

20. The apparatus of claim 17, wherein said character information includes a character code, and said auxiliary character data is generated in accordance with said character code.

recording successive tracks on said record medium, each track containing said digital video and digital audio data, said topic data and said menu data in said predetermined format.

21. Method of recording digital video and digital audio data on a record medium, comprising the steps of:
    receiving digital video and digital audio data and topic data having identifying topics to be recorded, each of said topic data corresponding to the received digital video and digital audio data;
    generating menu data in accordance with said identifying topics, said menu data representing a menu of said identifying topics;

arranging said digital video and digital audio data, said topic data and said menu data in a predetermined format for recording, said format including video, audio and sub-code areas in which video data, audio data and menu data, respectively, are provided, said video and audio areas having respective auxiliary areas in which topic data is provided; and recording successive tracks on said record medium, each track containing said digital video and digital audio data, said topic data and said menu data in said predetermined format.

22. The method of claim 21, wherein said topic data is associated with one of said digital video data and said digital audio data, topic data associated with said digital video data is recorded in said auxiliary area of said video area, and topic data associated with said digital audio data is recorded in said auxiliary area of said audio area.

23. The method of claim 22, wherein said menu data includes position data indicative of the respective area of a track in which said topic data is located, and said step of recording records said position data in said sub-code area of each of said successive tracks.

24. The method of claim 23, further comprising the steps of generating table-of-content data identifying the content of the data recorded in said video and audio areas of each track, and post-recording said table-of-content data in said sub-code area of each of said successive tracks.

25. The method of claim 24, wherein said table-of-content data includes identifying topic table-of-contents, and said menu data includes said identifying topic table-of-contents.

26. The method of claim 24, wherein said table-of-content data identifies chapters of a program recorded on tracks on said record medium.

27. The method of claim 26, wherein said table-of-content data identifies the chapter recorded in the respective track in which said table-of-content data is recorded.

28. The method of claim 26, wherein said table-of-content data identifies parts of each of said chapters and also identifies the part recorded in the respective track in which said track having said table-of-content data is recorded.

29. The method of claim 26, wherein said step of generating table-of-content data determines a beginning and an ending of each of said chapters, and wherein said table of content data includes data corresponding to said beginning and said ending of each of said chapters.

30. The method of claim 29, wherein said table-of-content data recorded on a respective track identifies the chapter in which said respective track is located.

31. The method of claim 21, wherein said topic data corresponding to at least one of said identifying topics includes character data representing a plurality of languages.

32. The method of claim 21, further comprising the steps of:

reproducing said menu data from said sub-code area of a track; and generating a menu list of said identifying topics from said menu data.

33. The method of claim 32, further comprising the steps of selecting one of said identifying topics from said menu list and providing said topic data corresponding to said selected identifying topic as an output.

34. The method of claim 33, wherein said step of providing provides said topic data by reproducing only said respective area of said track in which said topic data is located.

35. The method of claim 33, wherein said topic data corresponding to at least one of said identifying topics includes character data representing a plurality of languages, said steps of selecting includes selecting a language of said selected identifying topic, and topic data corresponding to said selected identifying topic and said selected language is provided as an output.

36. Method of recording digital video and digital audio data on a record medium, comprising the steps of:

receiving digital video data, digital audio data, topic data corresponding to the received digital video and digital audio data and having identifying topics, and character information from a teletext broadcast system;

generating auxiliary character data from said character information in accordance with said teletext broadcast system;

arranging said digital video and digital audio data and said auxiliary character data in a predetermined format for recording, said format including video and audio areas in which video data and audio data, respectively, are provided, said video and audio areas having respective auxiliary areas in which auxiliary character data and topic data are provided; and recording successive tracks on said record medium, each track containing said digital video data, said digital audio data, said topic data and said auxiliary character data in said predetermined format.

37. The method of claim 36, wherein said auxiliary character data includes a list of broadcast programs identifying said digital video and digital audio data that can be received.

38. The method of claim 36, wherein said character information includes a control code, and said auxiliary character data is generated in accordance with said control code.

39. The method of claim 36, wherein said character information includes a character code, and said auxiliary character data is generated in accordance with said character code.

* * * * *